(12) United States Patent
Kanekawa et al.

(10) Patent No.: US 8,089,233 B2
(45) Date of Patent: Jan. 3, 2012

(54) PHYSICAL QUANTITY CONVERSION SENSOR AND MOTOR CONTROL SYSTEM USING THE SAME

(75) Inventors: Nobuyasu Kanekawa, Hitachi (JP); Masamichi Yamada, Hitachinaka (JP); Shoji Sasaki, Hitachinaka (JP); Katsuaki Fukatsu, Naka (JP); Kenji Nakabayashi, Hitachinaka (JP); Daisuke Terada, Hitachinaka (JP)

(73) Assignee: HItachi, Ltd., Tokyo (JP)

( * ) Notice: Subject to any disclaimer, the term of this patent is extended or adjusted under 35 U.S.C. 154(b) by 573 days.

(21) Appl. No.: 12/199,367

(22) Filed: Aug. 27, 2008

(65) Prior Publication Data

US 2009/0058407 A1 Mar. 5, 2009

(30) Foreign Application Priority Data

Aug. 30, 2007 (JP) ................. 2007-224447

(51) Int. Cl.
*H02K 29/08* (2006.01)
(52) U.S. Cl. ......... 318/400.38; 318/400.37; 318/400.39; 318/400.4
(58) Field of Classification Search ............. 318/400.38, 318/400.39, 400.01, 400.14, 605, 661, 400.37, 318/652, 653, 400.4; 324/207.21, 242, 243, 324/244, 251
See application file for complete search history.

(56) References Cited

U.S. PATENT DOCUMENTS

| | | | |
|---|---|---|---|
| 6,728,904 B2 | 4/2004 | Kanekawa et al. | |
| 6,892,588 B2* | 5/2005 | Nagase et al. | ........... 73/862.326 |
| 7,009,535 B2 | 3/2006 | Kanekawa et al. | |
| 7,053,602 B2* | 5/2006 | Jin et al. | ................. 324/207.16 |
| 7,138,796 B2* | 11/2006 | Miya | ..................... 324/207.25 |
| 7,157,906 B2* | 1/2007 | Miya | ..................... 324/207.25 |
| 7,312,545 B2 | 12/2007 | Sasaki et al. | |
| 2004/0263014 A1* | 12/2004 | Miya | ............................ 310/168 |
| 2005/0016789 A1* | 1/2005 | Asada | ........................... 180/444 |
| 2006/0125439 A1* | 6/2006 | Ajima et al. | .................. 318/716 |
| 2007/0201171 A1 | 8/2007 | Kanekawa et al. | |
| 2008/0116886 A1 | 5/2008 | Yamada et al. | |

FOREIGN PATENT DOCUMENTS

| | | |
|---|---|---|
| JP | 2005-315840 A | 11/2005 |
| JP | 2007-21552 A | 1/2006 |
| JP | 2007-263943 A | 10/2007 |
| JP | 2008-134215 A | 6/2008 |

OTHER PUBLICATIONS

"KMA200, Programmable angle sensor", Rev. Aug. 5-16, 2005, Product data sheet, Koninklijke Philips Electronics N.V. 2005 (Thrity-one (31) pages).

* cited by examiner

*Primary Examiner* — Walter Benson
*Assistant Examiner* — Antony M Paul
(74) *Attorney, Agent, or Firm* — Crowell & Moring LLP

(57) ABSTRACT

A first sensor element outputs a first output signal in correspondence to a direction of the magnetic flux lines acting from the outside. A second sensor element outputs a second output signal associated with the first output signal in correspondence to a direction of the magnetic flux lines acting from the outside. A first conversion processing section converts the first output signal output from the first sensor element and the second output signal output from the second sensor element into the second physical quantity. A second conversion processing section converts the first output signal output from the first sensor element and the second output signal output from the second sensor element into a signal representing the rotation angle of the motor.

21 Claims, 32 Drawing Sheets

PHYSICAL QUANTITY CONVERSION SENSOR AND MOTOR CONTROL SYSTEM USING THE SAME

BACKGROUND OF THE INVENTION

1. Field of the Invention

The present invention relates to a physical quantity conversion sensor and a motor control system using the physical quantity conversion sensor. More particularly, the invention relates to a physical quantity conversion sensor well suited for using magneto-resistance effect elements as sensors, and a motor control system using the physical quantity conversion sensor.

2. Description of the Related Art

In a servo control system, rotation angle sensors are necessary to implement feedback control by detecting the rotation angle. In addition, in brushless motor control, rotation angle sensors are necessary not only for the servo control system but also for others because the current has to be applied to coils of a motor in correspondence to the rotation angle of the motor.

Further, a high level of safety is required in the case the system using the rotation angle sensors are applied to, for example, x-by-Wire that controls the behavior of the automobile vehicle body through integral control of electric power steering, electric braking, and electrically-controlled throttle devices, a steering system, and a braking system. Conventionally, a redundant technique preliminarily including an excessive number of components has been widely employed to satisfy the requirement for such a high level of safety, that is, to detect abnormality.

The rotation angle sensor using magnetism includes sensor elements that output signals proportional to the sine ("sin") and cosign ("cos") of the rotation angle, and conversion processing sections that obtain the rotation angle from the signals proportional to the sine ("sin") and cosign ("cos") from the sensor elements. According to conventional technique, however, the components are mounted in discrete packages, or as described in Non-patent Publication 1 below (*), the components are all mounted in a single package.

(*) Non-patent Publication: "KMA200, Programmable angle sensor," Rev.05-16 Aug. 2005, Product data sheet, Koninklijke Philips Electronics N.V. 2005)

As described in Non-patent Publication 1, the technique in which the sensor elements and conversion processing section are mounted in the single package is effective in cost reduction associated with reduction in size and the number of connections, and in reliability improvement. However, it is desired to further take extensibility in regard to "non-redundant configuration→redundant configuration" into consideration.

For application to a use case that requires a high reliability such as described above, redundancy is necessary for the conversion processing section to implement fault detection. On the other hand, however, in many cases, since the sensor elements output two signals proportional to the sine ("sin") and cosign ("cos") of the rotation angle, the sensor elements already have redundancy in a certain extent; that is, further redundancy is not necessary. For example, when the characteristic represented by "$(\sin\theta)^2 + (\cos\theta)^2 = 1$" is utilized, whether a determination can be made whether the output of the respective sensor element is normal or abnormal. However, in the technique in which the sensor elements and conversion processing section are mounted in the single package, two packages have to be preliminarily provided, as described in Non-patent Publication 1. That is, excessive redundancy has to be provided for the convenience of the mounting or implementation method. This leads to cost elevation.

SUMMARY OF THE INVENTION

An object of the present invention is to provide a redundantly configurable physical quantity conversion sensor and a motor control system using the physical quantity conversion sensor without increasing the cost.

In order to achieve the object, according to one embodiment of the present invention, there is provided a physical quantity conversion sensor including a first sensor element that outputs a first output signal in correspondence to a first physical quantity acting from the outside; a second sensor element that outputs a second output signal associated with the first output signal in correspondence to the first physical quantity acting from the outside; a first conversion processing section that converts the first output signal output from the first sensor element and the second output signal output from the second sensor element into the second physical quantity; and a second conversion processing section that converts the first output signal output from the first sensor element and the second output signal output from the second sensor element into the second physical quantity.

According to another embodiment of the present invention, there is provided a physical quantity conversion sensor including a first sensor element that outputs a first output signal in correspondence to a first physical quantity acting from the outside; a second sensor element that outputs a second output signal associated with the first output signal in correspondence to the first physical quantity acting from the outside; a first conversion processing section that converts the first output signal output from the first sensor element and the second output signal output from the second sensor element into the second physical quantity; and an output terminal that outputs an output of each of the first and second sensor elements to the outside of a first package. The first and second sensor elements and the first conversion processing section are arranged in the first package.

According to another embodiment of the present invention, there is provided a physical quantity conversion sensor including a first sensor element that outputs a first output signal in correspondence to a first physical quantity acting from the outside; a second sensor element that outputs a second output signal associated with the first output signal in correspondence to the first physical quantity acting from the outside; and a first conversion processing section that converts the first output signal output from the first sensor element and the second output signal output from the second sensor element into the second physical quantity; and a second conversion processing section that converts the first output signal output from the first sensor element and the second output signal output from the second sensor element into a third physical quantity associated with the second physical quantity.

According to another embodiment of the present invention, there is provided a physical quantity conversion sensor including a first sensor element that outputs a first output signal in correspondence to a first physical quantity acting from the outside; a second sensor element that outputs a second output signal associated with the first output signal in correspondence to the first physical quantity acting from the outside; a third sensor element that outputs the second output signal associated with the first output signal in correspondence to the first physical quantity acting from the outside; a first conversion processing section that converts the first output signal output from the first sensor element and the second output signal output from the second sensor element into the second physical quantity; and a second conversion processing section that converts the first output signal output from the first sensor element and the second output signal output from the third sensor element into a third physical quantity associated with the second physical quantity.

According to another embodiment of the present invention, there is provided a motor control system including a motor; a motor control device (means) that controls a rotation angle of the motor; a magnet that rotates with rotation of a rotation shaft of the motor; and a rotation angle sensor that detects a direction of magnetic flux lines generated by the magnet to thereby detect a rotation angle of the motor. The rotation angle of the motor is controlled in accordance with the rotation angle detected by the rotation angle sensor. The rotation angle sensor includes a first sensor element that outputs a first output signal in correspondence to a direction of the magnetic flux lines acting from the outside; a second sensor element that outputs a second output signal associated with the first output signal in correspondence to a direction of the magnetic flux lines acting from the outside; a first conversion processing section that converts the first output signal output from the first sensor element and the second output signal output from the second sensor element into a signal representing the rotation angle of the motor; and a second conversion processing section that converts the first output signal output from the first sensor element and the second output signal output from the second sensor element into the second physical quantity.

According to the present invention, the redundant configuration can be implemented without increasing the cost.

DETAILED DESCRIPTION OF THE PREFERRED EMBODIMENTS

First Embodiment

The configuration of a redundantly configurable physical quantity conversion sensor of a first embodiment of the present invention will be described below with reference to FIGS. 1 to 6B. More specifically, as one example of the physical quantity conversion sensor, a rotation angle sensor will be described below.

First, with reference to FIG. 1, a basic construction of the physical quantity conversion sensor of the first embodiment of the present invention will be described herebelow.

Figure 1:
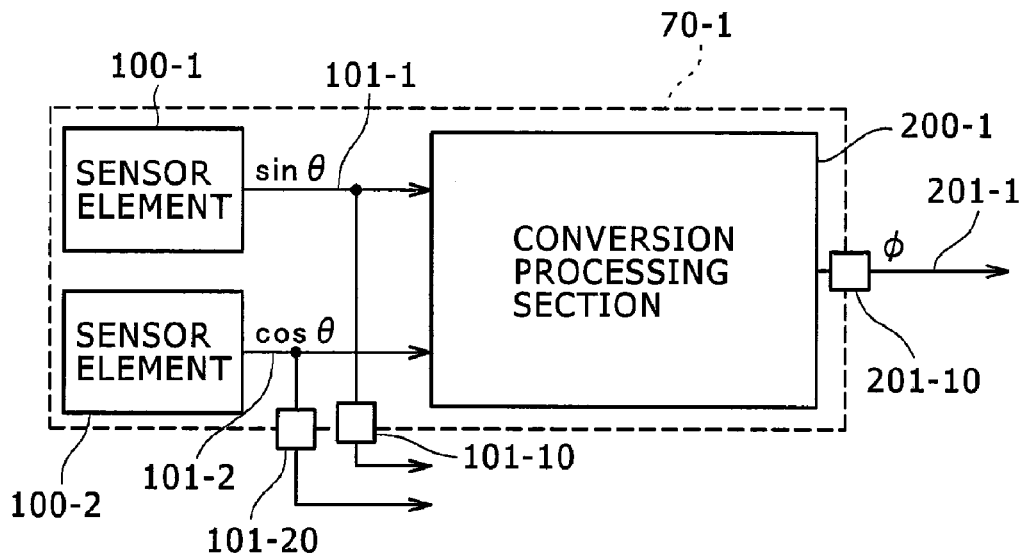
FIG. 1 is a block diagram showing a basic construction of a physical quantity conversion sensor of a first embodiment of the present invention.

FIG. 1 is a block diagram of the physical quantity conversion sensor of the first embodiment of the present invention.

Sensor elements 100-1 and 100-2 and a conversion processing section 200-1 are mounted or implemented inside of a package 70-1. The sensor element 100-1 outputs a signal 101-1 proportional to the sine ("sin") of a rotation angle $\theta$, and the sensor element 100-2 outputs a signal 101-2 proportional to the cosign ("cos") of the rotation angle $\theta$. However, the sensor elements 100-1 and 100-2, respectively, may output signals proportional to the sine ("sin") and cosign ("cos") of the rotation angle $\theta$. The conversion processing section 200-1 executes conversion processing of the signal 101-1 proportional to the sine ("sin") and the signal 101-2 proportional to the cosign ("cos"), whereby an estimated value $\phi 201$-1 of the rotation angle $\theta$ is obtained.

The sensor elements 100-1 and 100-2 each use giant magnetic resistance (GMR) elements, as described further below with reference to FIG. 26. However, magnetic resistance (MR) elements can be displaced by the GMR elements. Description herebelow refers to the GMR elements to be inclusive of the MR elements. As described further below, the sensor elements 100-1 and 100-2 are connected together via wires (or wire-connected together), thereby configuring a Wheatstone Bridge circuit, as described further below with reference to FIGS. 26A and 26C. In the configuration, in the event the sensor element 100-1 outputs the signal 101-1 proportional to the sine ("sin") of the rotation angle $\theta$, the sensor element 100-2 outputs the signal 101-2 proportional to the cosign ("cos") of the rotation angle $\theta$. In order to form the configuration, the magnetization directions of four GMR elements that configure the sensor element 1001-1 are, respectively, different by 90 degrees with respect to four GMR elements that configure the sensor element 100-2. For example, in the event four GMR elements configuring the sensor element 1001-1 are, respectively, magnetized in the arrow directions shown in FIG. 26B, four GMR elements configuring sensor element 100-2 are magnetized in the arrow directions shown in FIG. 26D. More specifically, the sensor elements 1001-1 and 100-2, respectively, output the signals 101-1 and 101-2 proportional to the sine ("sin") and cosign ("cos"), i.e., signals relative to one another.

The sensor elements 100-1 and 100-2 are arranged in the extension direction of, for example, a rotation shaft of a rotator (a rotation shaft of a motor (FIG. 45)) or a rotation shaft (FIG. 48) of a throttle valve. The sensor elements 100-1 and 100-2 are arranged to overlap with one another along the extension direction of the rotation shaft of the rotator. Further, a magnet (FIG. 43) that rotates with a rotation shaft is provided to an end portion of the rotation shaft of the rotator. Through detection of the direction of magnetic force lines of the magnet, the sensor elements 100-1 and 100-2 are enabled to detect the rotation angle θ of the rotation shaft of the rotator.

In the present embodiment, the package 70-1 includes an output terminal 201-10 that outputs the estimated value φ201-1 of the rotation angle θ to the outside of the package 70-1. The package 70-1 further includes output terminals 101-10 and 101-2 that, respectively, output the signals 101-1 and 101-2 proportional to the sine ("sin") and the cosign ("cos") to the outside of the package 70-1.

The output terminals 101-10 and 101-20 are, respectively, lead pins 101-10 and 101-20 described further below with reference to FIGS. 2A and 2B, or lead pins 101-10 and 101-20 that are coupled to a through-hole 73 described further below with reference to FIG. 11, for example. Thereby, the output terminals 101-10 and 101-20 work as means (devices) for producing outputs to the outside of the package or devices for connection from the package to the outside.

First Embodiment

Example Practical Configurations

Example practical configurations of physical quantity conversion sensors of the present embodiment will be described herebelow with reference to FIGS. 2 to 6.

FIGS. 2 to 6 are cross sectional views and/or plan views showing example practical configurations of the physical quantity conversion sensors of the present embodiment. In FIGS. 2 to 6, the identical reference numerals to those of FIG. 1 refer to the identical portions throughout.

First, a first example practical configuration will be described hereinbelow with reference to FIGS. 2A and 2B. FIGS. 2A and 2B show the first example practical configuration of the physical quantity conversion sensor of the first embodiment of the present invention. FIG. 2A is a cross sectional view taken along the line A-A' of FIG. 2B, and FIG. 2B is a plan view.

The sensor elements 100-1 and 100-2, respectively, are provided in separate chips, and are laminated on a circuit board or lead frame 71-1. Further, the conversion processing section 200-1 is fixed on the circuit board or lead frame 71-1. Leads are provided as the output terminals 101-10 and 101-20 on the side where the sensor elements 100-1 and 100-2 are located. Leads are provided as the output terminal 201-10 on the side where the conversion processing section 200-1 is located. The sensor elements 100-1 and 100-2, the conversion processing section 200-1, the circuit board or lead frame 71-1, the output terminals 101-10 and 101-20, and the output terminal 201-10 are integrally molded from resin, thereby configuring the package 70-1.

In the present example configuration of the physical quantity conversion sensor of the third embodiment of the present invention, the respective sensor elements 100-1 and 100-2 are laminated in separate chips, so that the probability of simultaneous faults in the sensor elements 100-1 and 100-2 can be reduced, i.e., the degree of independence of faults in the sensor elements 100-1 and 100-2 can be increased.

Figure 3:
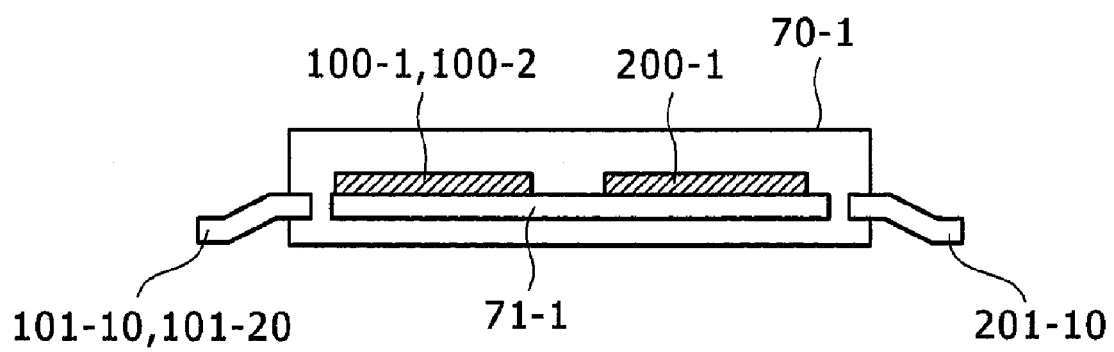
FIG. 3 is a cross sectional view that shows an example practical configuration of a physical quantity conversion sensor of the first embodiment of the present invention.

Next, a second example practical configuration will be described herebelow with reference to FIG. 3. FIG. 3 is a cross sectional view showing the second example practical configuration of the physical quantity conversion sensor of the first embodiment of the present invention.

In the present example configuration, the respective sensor elements 100-1 and 100-2 are provided in a common chip. Other configuration portions are identical to those shown in FIGS. 2A and 2B.

In the present example configuration, positional and angular misalignments between the sensor elements 100-1 and 100-2 are minimized, so that accuracy is optimized to be highest.

Figure 4:
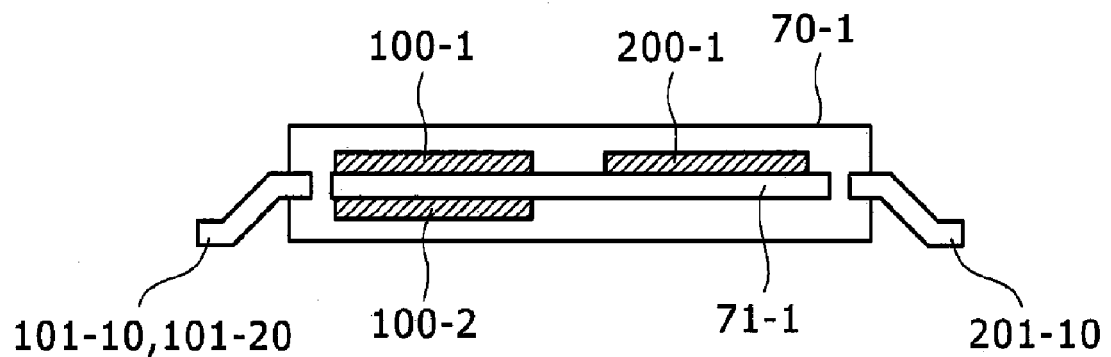
FIG. 4 is a cross sectional view that shows an example practical configuration of a physical quantity conversion sensor of the first embodiment of the present invention.

Next, a third example practical configuration will be described herebelow with reference to FIG. 4. FIG. 4 is a cross sectional view showing the third example practical configuration of the physical quantity conversion sensor of the first embodiment of the present invention.

In the present example configuration, the respective sensor elements 100-1 and 100-2 are provided in separate chips, and are mounted on both sides of the circuit board or lead frame 71-1.

In the present configuration, the degree of independence in probability of simultaneous faults, i.e., faults, in the sensor elements 100-1 and 100-2 can be maximized. This is because the configuration is formed such that the circuit board or lead frame 71-1 is interposed between the sensor elements 100-1 and 100-2.

Figure 5A:
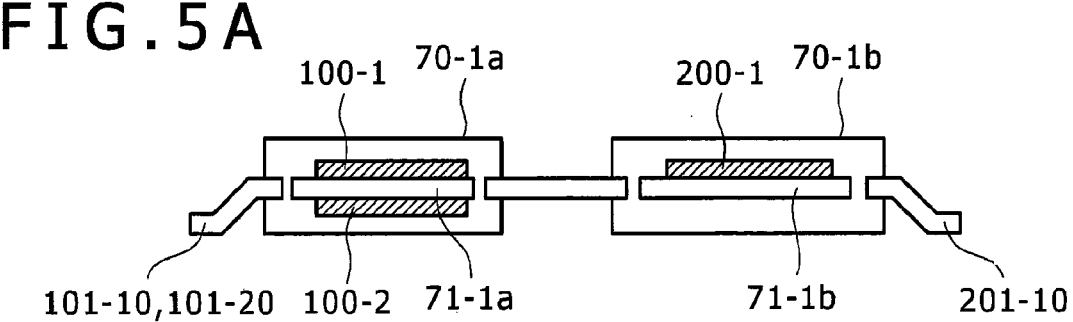
FIGS. 5A and 5B, respectively, are a cross sectional view and a plan view that show an example practical configuration of a physical quantity conversion sensor of the first embodiment of the present invention.
Figure 5B:
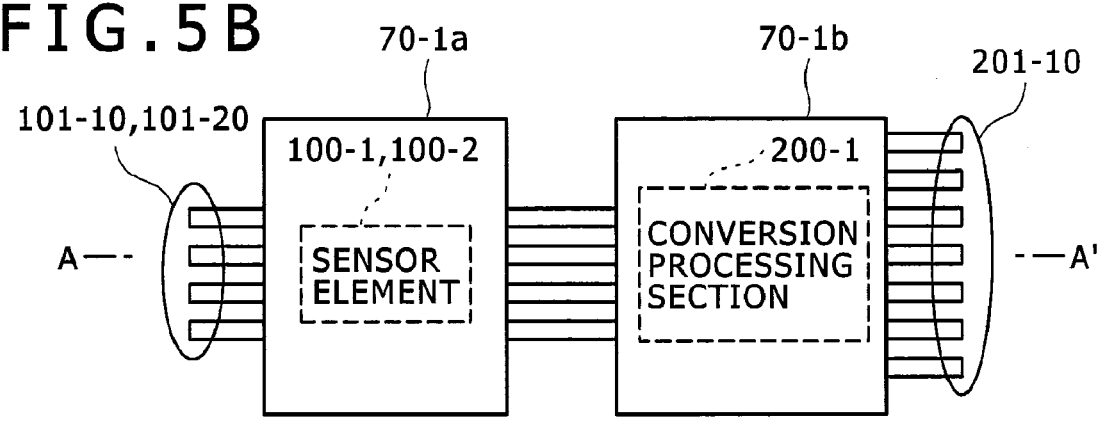

Next, a fourth example practical configuration will be described herebelow with reference to FIGS. 5A and 5B. FIGS. 5A and 5B show the fourth example practical configuration of the physical quantity conversion sensor of the first-embodiment of the present invention. FIG. 5A is a cross sectional view taken along the line A-A' of FIG. 5B, and FIG. 5B is a plan view.

In the present example configuration, the respective sensor elements 100-1 and 100-2 are provided in separate chips, and are mounted on both sides of the circuit board or lead frame substrate 71-1*a*. Leads are provided as the output terminals 101-10 and 101-20 on one of both of the sides. The sensor elements 100-1 and 100-2, the circuit board or lead frame 71-1*a*, and the output terminals 101-10 and 101-20 are integrally molded from resin, thereby configuring a package 70-1*a* (or "first package," herebelow).

Further, the conversion processing section 200-1 is fixed to a circuit board or lead frame 71-1*b*. Leads are provided as the output terminal 201-10 and 201-20 on one of both of the sides. The conversion processing section 200-1, the circuit board or lead frame 71-1*b*, and the output terminal 201-10 are integrally molded from resin, thereby configuring a package 70-1*b* (or "second package," herebelow).

Further, connection leads connect between the first and second packages 70-1*a* and 70-1*b*.

Figure 6A:
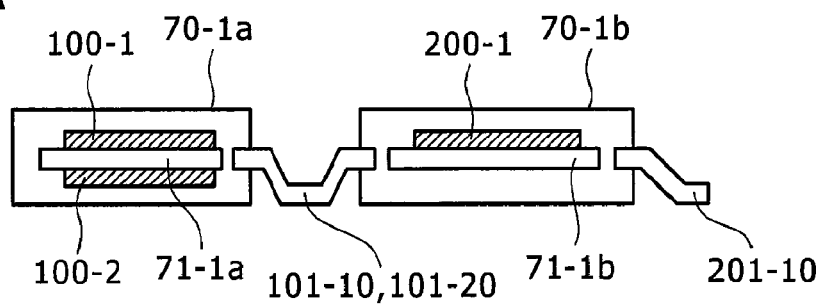
FIGS. 6A and 6B, respectively, are a cross sectional view and a plan view that show an example practical configuration of a physical quantity conversion sensor of the first embodiment of the present invention.
Figure 6B:
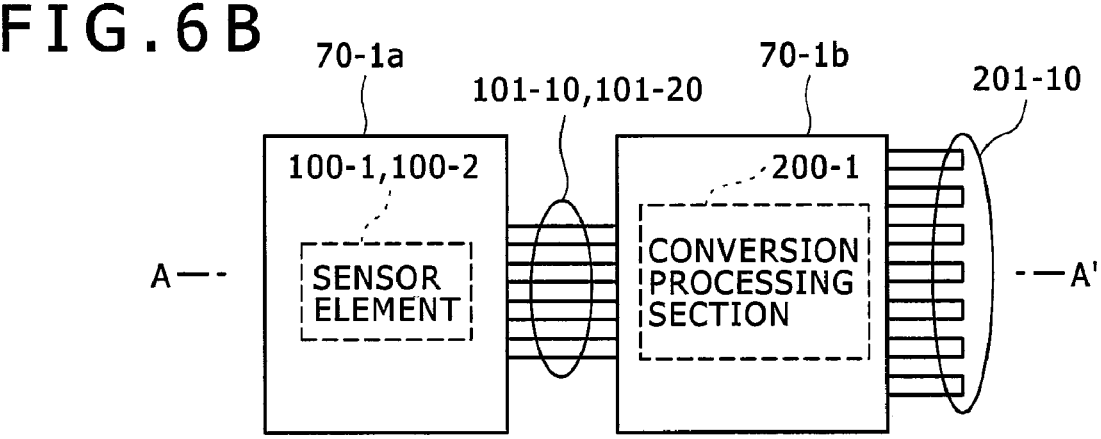

Next, a fifth example practical configuration will be described herebelow with reference to FIGS. 6A and 6B. FIGS. 6A and 6B show the fifth example practical configuration of the physical quantity conversion sensor of the first embodiment of the present invention. FIG. 6A is a cross sectional view taken along the line A-A' of FIG. 6B, and FIG. 6B is a plan view.

In the present example configuration, the respective sensor elements 100-1 and 100-2 are provided in separate chips, and are mounted on both sides of the circuit board or lead frame substrate 71-1*a*. Leads are provided as the output terminals 101-10 and 101-20 on one of both of the sides. The sensor elements 100-1 and 100-2, the circuit board or lead frame 71-1*a*, and the output terminal 101-10 and 101-20 are integrally molded from resin, thereby configuring the first package 70-1*a*.

Further, the conversion processing section 200-1 is fixed to the circuit board or lead frame 71-1*b*. Leads are provided as the output terminals 201-10 and 201-20 on one of both of the sides. The conversion processing section 200-1, the circuit board or lead frame 71-1*b*, and the output terminal 201-10 are integrally molded from resin, thereby configuring the second package 70-1*b*.

Further, as shown in FIG. 6A, the output terminals 101-10 and 101-20 are bent, and are used also as connection leads connecting between the first package 70-1*a* and the second package 70-1*b*. Thus, the output terminals 101-10 and 101-20 are formed into a bent shape, thereby enabling connection through, for example, soldering to a circuit board (not shown).

Second Embodiment

Next, a physical quantity conversion sensor having a redundant configuration (or "redundantly configured physical quantity conversion sensor," herebelow) according to a second embodiment of the present invention will be described with reference to FIGS. 7 to 16.

First, a basic construction of the physical quantity conversion sensor of the present embodiment will be described herebelow with reference to FIGS. 7 and 8.

Figure 7:
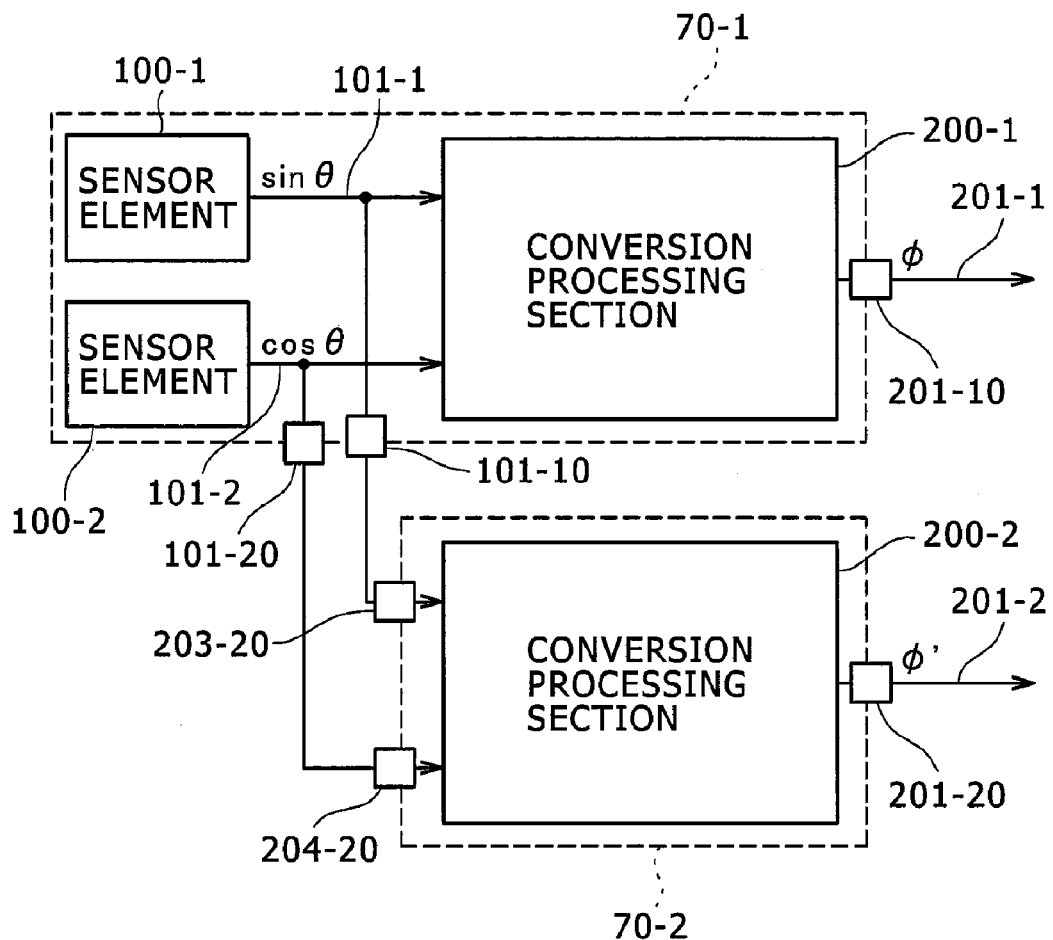
FIG. 7 is a block diagram showing a basic construction of a physical quantity conversion sensor of a second embodiment of the present invention.
Figure 8:
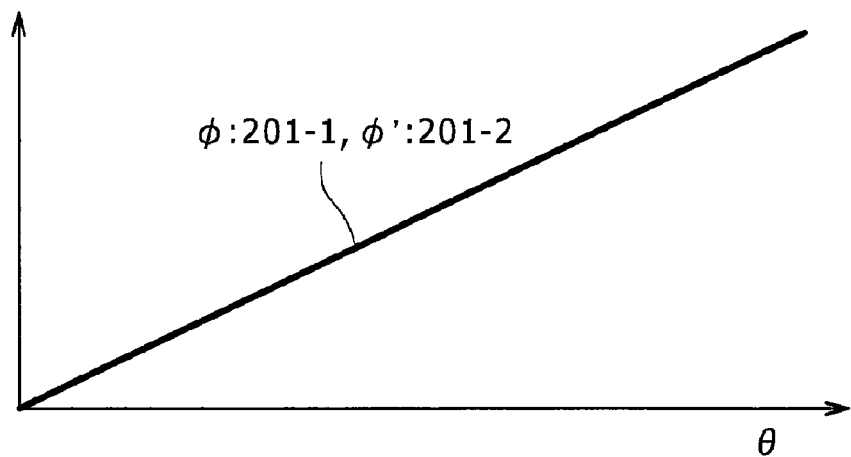
FIG. 8 is an output characteristic diagram showing the characteristics of the physical quantity conversion sensor of the second embodiment of the present invention.

FIG. 7 is a block diagram showing the basic construction of the physical quantity conversion sensor of the second embodiment of the present invention. In the drawing, the identical reference numerals in FIG. 1 refer to the identical portions. FIG. 8 is an output characteristic diagram showing output characteristics of the physical quantity conversion sensor of the second embodiment of the present invention.

The present example configuration includes a second package 70-2 in addition to the configuration shown in FIG. 1. The second package 70-2 includes a conversion processing section 200-2 that is similar to the conversion processing section 200-1 shown in FIG. 1.

The respective signals 101-1 and 101-2 proportional to the sine ("sin") and the cosign ("cos"), which have been derived by the output terminals 101-10 and 101-20 to the outside of the package 70-1, are input into the inside of the second package 70-2 through input terminals 203-20 and 204-20 and are further input into the conversion processing section 200-2.

In the present embodiment, the conversion processing sections 200-1 and 200-2 are designed in compliance with common specifications. As such, as shown in FIG. 8, the conversion processing sections 200-1 and 200-2, respectively, output estimated values $\phi 201\text{-}1$ and $\phi'201\text{-}2$ of the same rotation angle $\theta$.

According to this example configuration, the outputs $\phi 201\text{-}l$ and $\phi'201\text{-}2$ of the respective redundantly configured conversion processing sections 200-1 and 200-2 are compared with one another, whereby faults of the respective conversion processing section 200-1, 200-2 can be detected.

Second Embodiment

Example Practical Example Configurations

Next, implementation or mounting of the physical quantity conversion sensor of the present embodiment will be described herebelow with reference to FIGS. 9 to 16.

FIGS. 9 to 16 are cross sectional views and/or plan views showing example practical example configurations of physical quantity conversion sensors of the second embodiment of the present invention. In FIGS. 9 to 16, the identical reference numerals to those of FIGS. 1 to 7 refer to the identical portions throughout.

Figure 9:
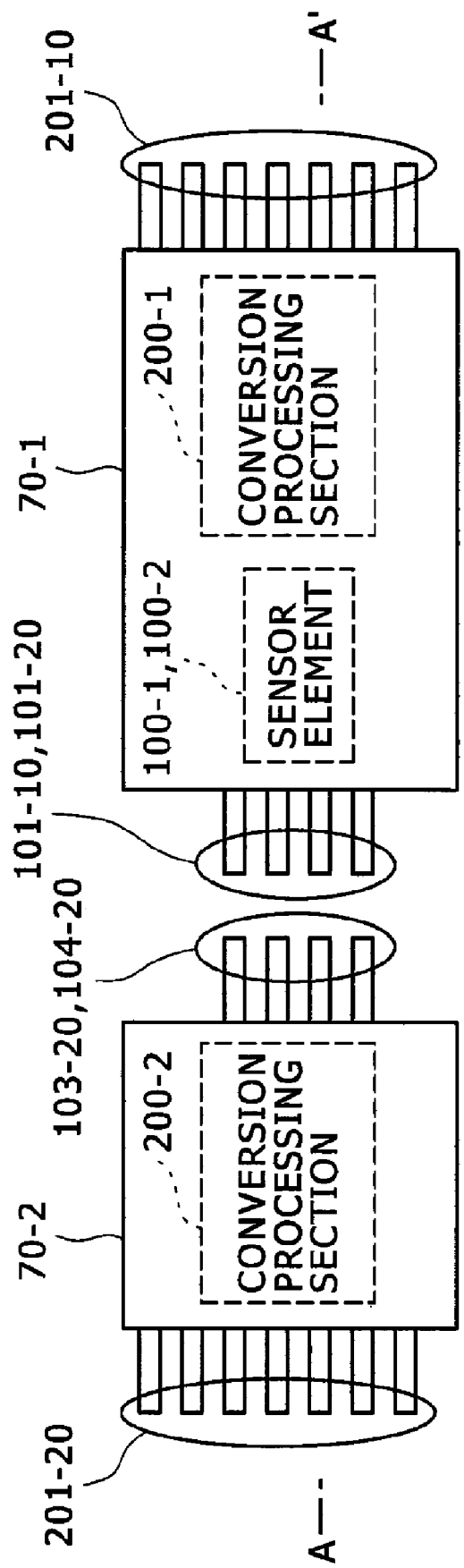
FIG. 9 is a plan view showing an example practical configuration of a physical quantity conversion sensor of the second embodiment of the present invention.
Figure 10:
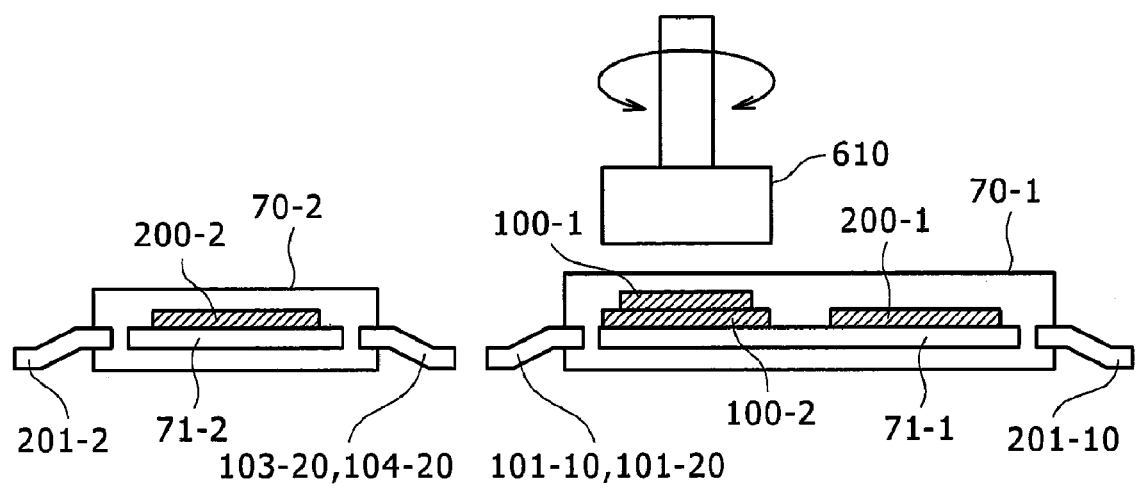
FIG. 10 is a cross sectional view showing an example practical configuration of a physical quantity conversion sensor of the second embodiment of the present invention.

First, a first example practical configuration will be described hereinbelow. FIGS. 9 and 10 show the example practical configuration of the physical quantity conversion sensor of the second embodiment of the present invention. FIG. 10 is a cross sectional view taken along the line A-A' of FIG. 9, and FIG. 9 is a plan view.

Figure 2A:
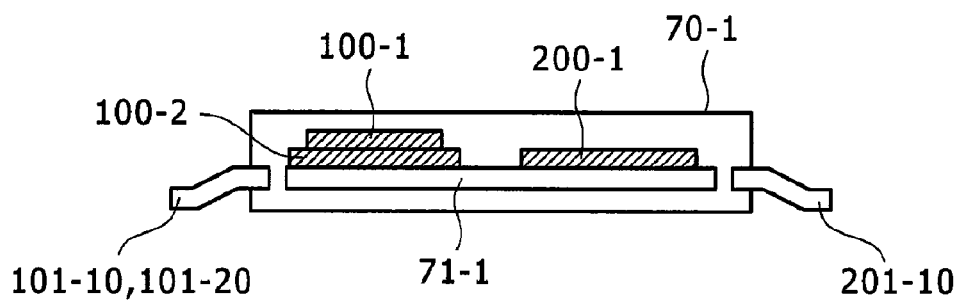
FIGS. 2A and 2B, respectively, are a cross sectional view and a plan view that show an example practical configuration of a physical quantity conversion sensor of the first embodiment of the present invention.
Figure 2B:
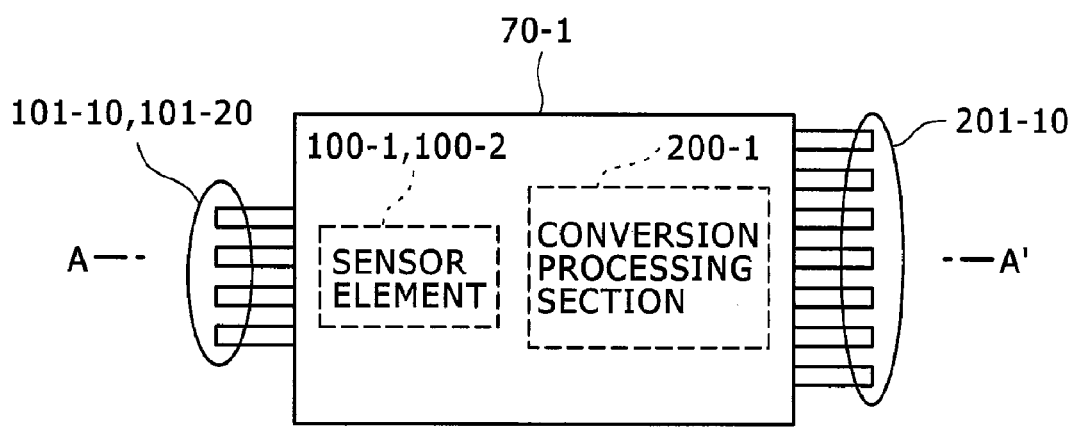

As shown in FIGS. 2A and 2B, in the package 70-1, the leads extended from the side where the sensor elements 100-1 and 100-2 are located are used as the output terminals 101-10 and 101-20 that, respectively, output the signal 101-1 proportional to the sine ("sin") and the signal 101-2 proportional to the cosign ("cos"). The second package 70-2 includes input terminals 203-20 and 204-20 on one side and an output terminal 201-20. The input terminal 203-20 inputs the signal 101-1 proportional to the sine ("sin"), the input terminal 204-20 inputs the signal 101-2 proportional to the cosign ("cos"), and the output terminal 201-20 outputs the estimated value $\phi 201\text{-}l$ of the rotation angle $\theta$.

As shown in FIGS. 9 and 10, the components are arranged on the circuit boards. Hence, the output terminal 101-10 of the package 70-1 and the input terminal 203-20 of the package 70-2 can be interconnected, and the output terminal 101-20 of the package 70-1 and the input terminal 204-20 of the second package 70-2 can be interconnected through the circuit boards.

Next, a second practical configuration example will be described herebelow with reference to FIG. 11. FIG. 11 is a cross sectional view of the second practical configuration example of the physical quantity conversion sensor of the second embodiment of the present invention.

As shown in FIGS. 6A and 6B, in the package 70-1, the leads extended from the sensor elements 100-1 and 100-2 are used as the output terminals 101-10 and 101-20 that, respectively, output the signal 101-1 proportional to the sine ("sin") and the signal 101-2 proportional to the cosign ("cos"). As shown therein, the leads are bent.

The second package 70-2 includes the conversion processing section 200-2 provided on leads 71-2. The second package 70-2 includes input terminals 203-20 and 204-20 on one side and an output terminal 201-20. The input terminal 203-20 inputs the signal 101-1 proportional to the sine ("sin"), the input terminal 204-20 inputs the signal 101-2 proportional to the cosign ("cos"), and the output terminal 201-20 outputs the estimated value $\phi 201\text{-}1$ of the rotation angle $\theta$.

The packages 70-1*a* and 70-1*b* are arranged on one side of the circuit board 71, and the package 70-2 is arranged on the other side of the circuit board the 71. Then, through the through-hole 73 formed in the circuit board the 71, the output terminal 101-10 of the package 70-1 and the input terminal 203-20 of the package 70-2 can be interconnected, and the output terminal 101-20 of the package 70-1 and the input terminal 204-20 of the second package 70-2 can be interconnected.

Signal Allocations in Respective Embodiments

Next, the leads of the lead frames that connect between the sensor elements 100-1 and 100-2 and the conversion processing sections 200-1 and 200-2 and signal allocation to bonding pads that electrically connect (or, simply "connect," hereinbelow) signals to the conversion processing section 200-1 will be described with reference to FIGS. 12 to 15B.

As further described below with reference to FIGS. 26A to 26D, the sensor elements 100-1 and 100-2 each include four GMR elements connected through a Wheatstone Bridge circuit. Hence, in a respective one of the sensor elements 100-1 and 100-2, there are provided not only a VCC terminal, which supplies the power source voltage to the Wheatstone Bridge circuit, and a GND terminal, which is grounded to the ground potential, but also two signal output terminals.

More specifically, from the sensor element 100-1, a SIN_N signal 101-1n and a SIN_P signal 101-1p are output, and the VCC voltage and the GND voltage are supplied. Similarly, from the sensor element 100-2, a COS_N signal 101-2n and a COS_P signal 101-2p are output, and the VCC voltage and the GND voltage are supplied.

Figure 12:
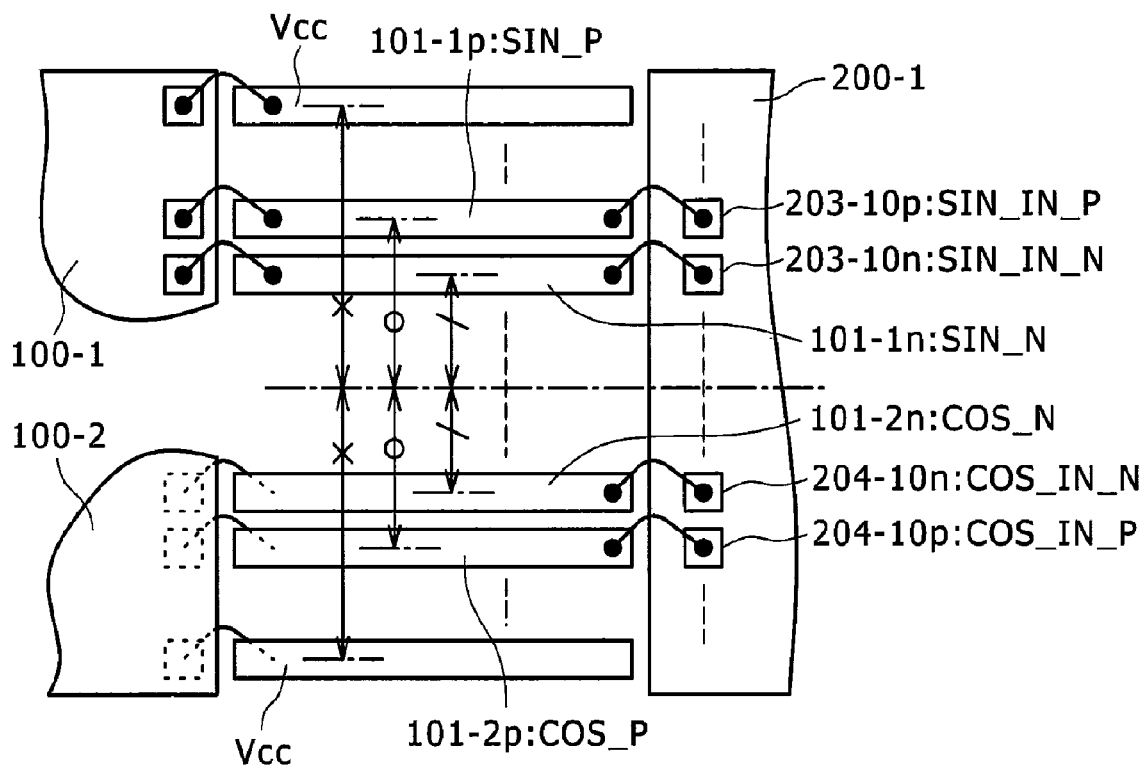
FIG. 12 is a plan view showing an example practical configuration of a physical quantity conversion sensor of the second embodiment of the present invention.

First signal allocation will be described herebelow with reference to FIG. 12. FIG. 12 omits illustration of leads for the GND voltage.

Reference is made to the respective cases shown in FIGS. 4 to 6B where the respective sensor elements 100-1 and 100-2 with same pad disposition are provided in the separate chips and are mounted on both sides of the circuit board or lead frame. In this case, as shown in FIG. 12, signals corresponding to the sensor elements 100-1 and 100-2 are arranged symmetric to one another. More specifically, leads of the lead frame of the circuit board for SIN_P signal 101-1p from the signal 101-1 and the COS_P signal 101-2p from the sensor element 100-2 are arranged symmetrical to one another. Similarly, leads for the SIN_N signal 101-1n from the sensor element 100-1 and the COS_P signal 101-2p from the sensor element 100-2 are arranged symmetrical to one another, and leads for the Vcc to the sensor element 100-1 and the Vcc to the sensor element 100-2 are arranged symmetrical to one another.

Figure 13:
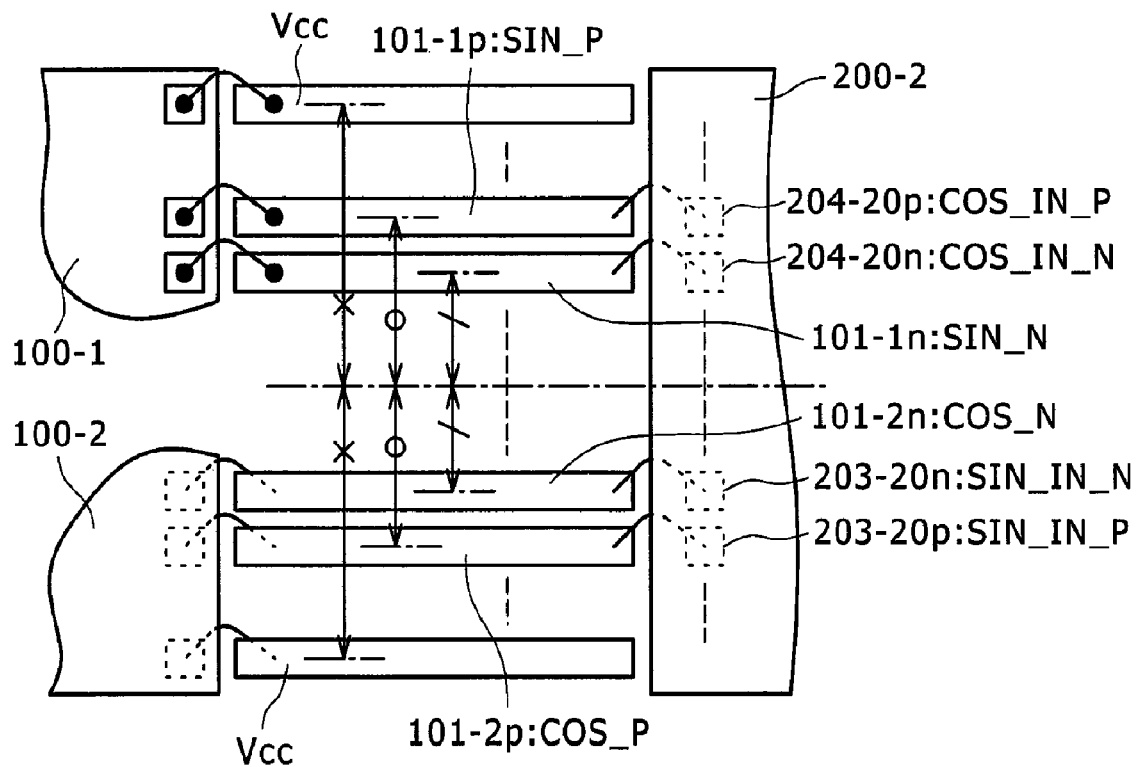
FIG. 13 is a plan view showing an example practical configuration of a physical quantity conversion sensor of the second embodiment of the present invention.
Figure 14:
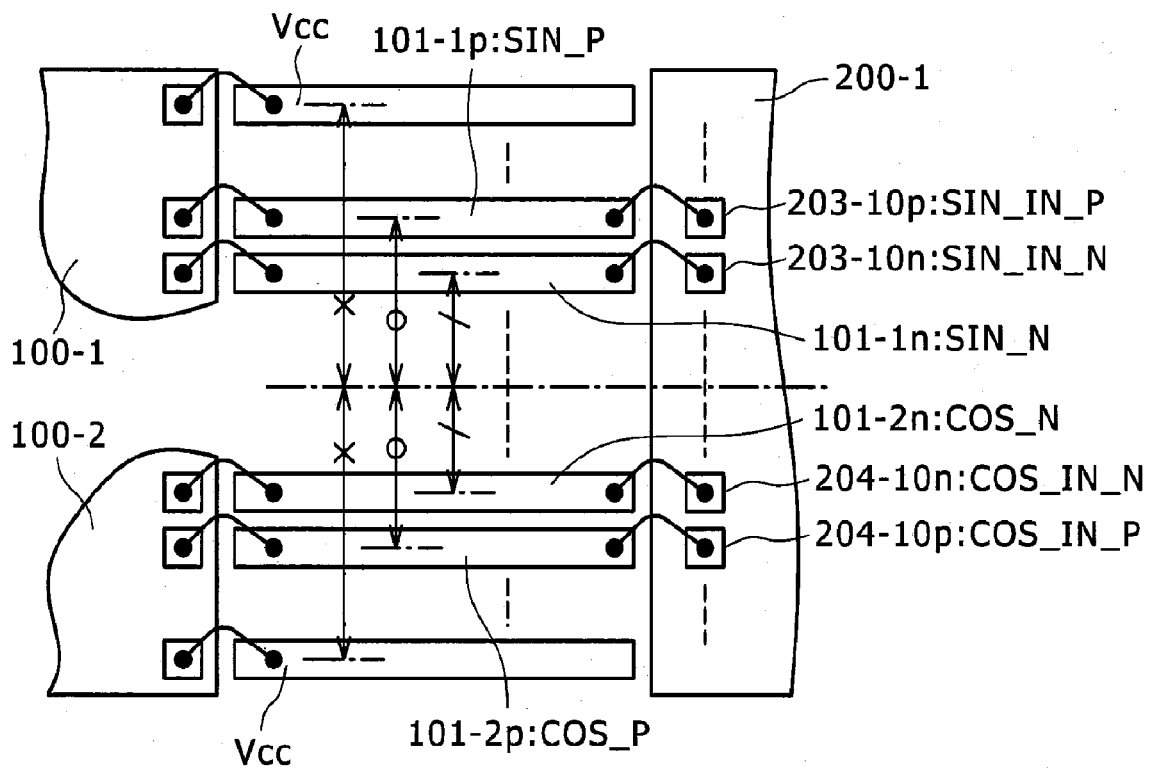
FIG. 14 is a plan view showing an example practical configuration of a physical quantity conversion sensor of the second embodiment of the present invention.

As described with reference to, for example, FIG. 4, the sensor elements 100-1 and 100-2 are arranged in the identical positions of the circuit board 71-1. However, for the convenience of description, FIG. 12 shows the state where the position of the sensor element 100-2 is transversely shifted with respect to the sensor element 100-1. FIGS. 13 and 14 are rendered in the same manner as FIG. 12.

According to the arrangements described above, the output signals of the sensor elements 100-1 and 100-2 can be connected to the conversion processing section 200-1 by use of wiring patterns of the circuit board of the single layer and the leads of the lead frame. Thereby, the signals are input to input terminals of the conversion processing section 200-1, as follows:

the SIN_P signal 101-1p is input to a SIN_IN_P terminal 203-10p of the conversion processing section 200-1;

the SIN_N signal 101-1n is input to a SIN_IN_N terminal 203-10n of the conversion processing section 200-1;

the COS_P signal 101-2p is input to a COS_IN_P terminal 204-10p of the conversion processing section 200-1; and the COS_N signal 101-2n is input to a COS_IN_N terminal 204-10n of the conversion processing section 200-1.

Inside of the conversion processing section 200-1, there is performed a conversion expressed below.

$$\varphi = \tan((SIN\_P\text{-}SIN\_N)/(COS\_P\text{-}COS\_N)),$$
$$= a\tan(\sin\theta/\cos\theta)$$
$$= a\tan(\tan\theta) = \theta$$

Next, second signal allocation will be described herebelow with reference to FIG. 13. FIG. 13 omits illustration of the leads of leads for the GND voltage.

Figure 11:
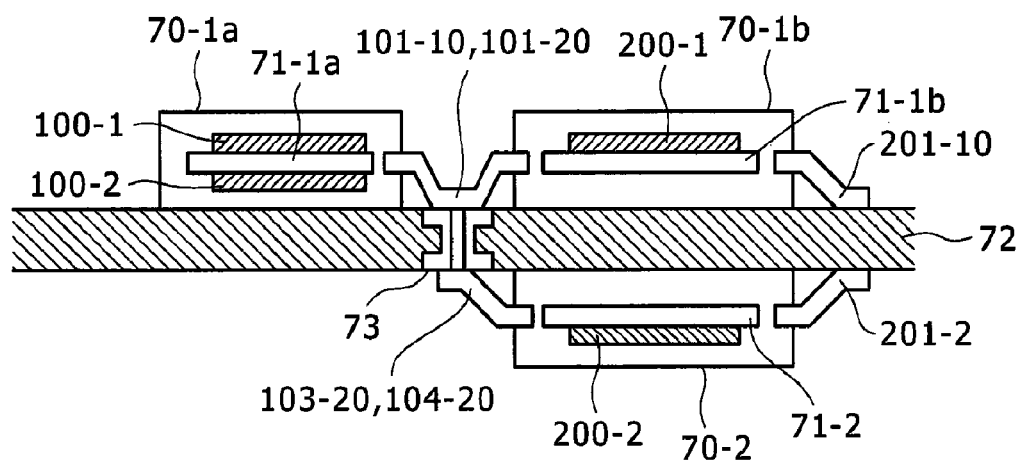
FIG. 11 is a cross sectional view showing an example practical configuration of a physical quantity conversion sensor of the second embodiment of the present invention.
Figure 19:
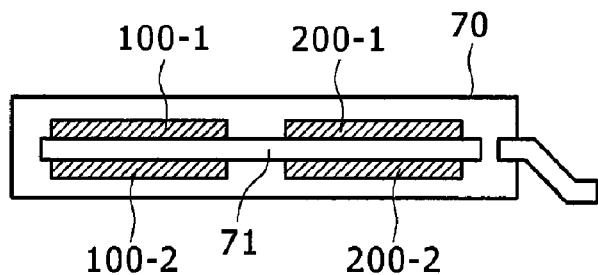
FIG. 19 is a cross sectional view showing an example practical configuration of a physical quantity conversion sensor of the third embodiment of the present invention.

Reference is made to, for example, the case where, as shown in FIG. 11, the conversion processing sections 200-1 and 200-2 are arranged on both sides of the circuit board 71, and the case where, as shown in FIG. 19, the conversion processing sections 200-1 and 200-2 are mounted on both sides of the lead frame or circuit board. Even in these cases, according to symmetrical arrangement of the signals corresponding to the sensor elements 100-1 and 100-2, the signals can be connected to the conversion processing section 200-1 by use of the leads of the lead frame of the circuit board of the single layer.

Thereby, the signals are input to the conversion processing section 200-1, as follows:

the COS_N signal 101-2n is input to the SIN_IN_P terminal 203-10p of the conversion processing section 200-1;

the COS_P signal 101-2p to the SIN_IN_N terminal 203-10n of the conversion processing section 200-1;

the SIN_N signal 101-1n to the COS_IN_P terminal 204-10p of the conversion processing section 200-1; and the SIN_P signal 101-1p to the COS_IN_N terminal 204-10n of the conversion processing section 200-1.

Inside of the conversion processing section 200-2, there is performed a conversion expressed below.

$$\varphi = a\tan((COS\_P\text{-}COS\_N)/(SIN\_P\text{-}SIN\_N)),$$
$$= a\tan(\cos\theta/\sin\theta)$$
$$= a\tan(\cot an\theta)$$
$$= \pi/2 - \theta$$

Next, third signal allocation will be described herebelow. FIG. 14 omits illustration of the leads of leads for the GND voltage.

In the case where, as shown in FIG. 14, the sensor elements 100-1 and 100-2 are mounted or implemented in the common chip, the pads of corresponding signal lines are arranged symmetrical to one another. Thereby, the signals can be connected to the conversion processing sections 200-1 and 200-2 by use of the leads of the lead frame of single-layer circuit board.

Thus, as shown in FIGS. 12 to 14, the leads of the lead frame of the wiring board are symmetrically arranged, thereby to enhance connectability between the sensor elements 100-1 and 100-2 and the conversion processing sections 201-1 and 201-2. Hence, connection therebetween can be accomplished through the wiring patterns of the single layer, which is a minimum number of layers, and consequently, cost reduction can be achieved.

Figure 15A:
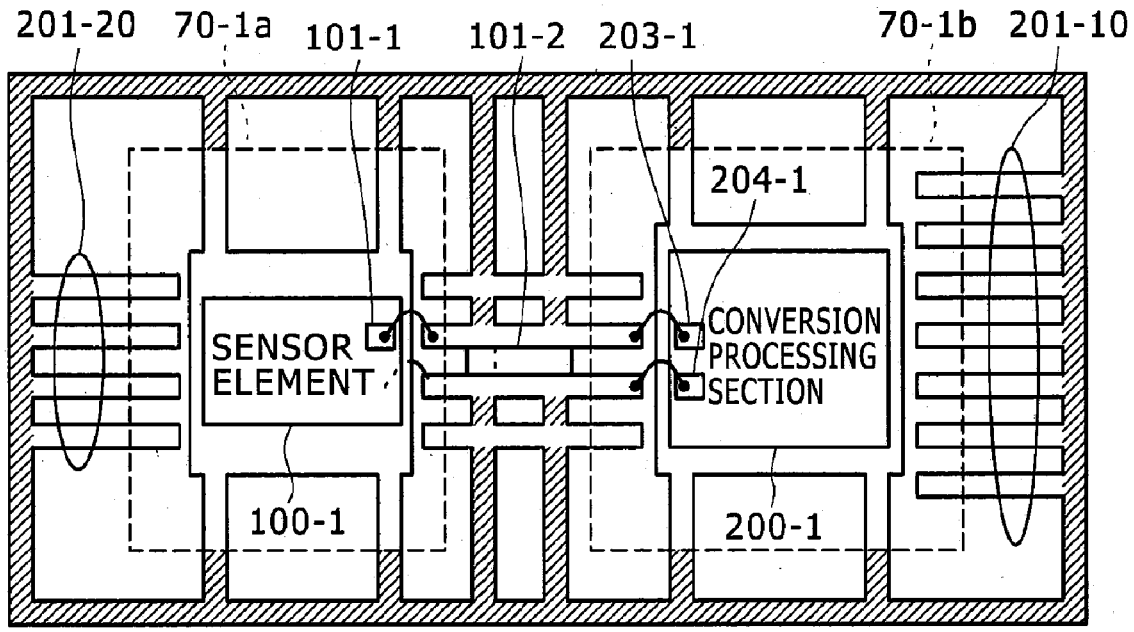
FIGS. 15A and 15B, respectively, are cross sectional views showing an example practical configuration of a physical quantity conversion sensor of the second embodiment of the present invention.
Figure 15B:
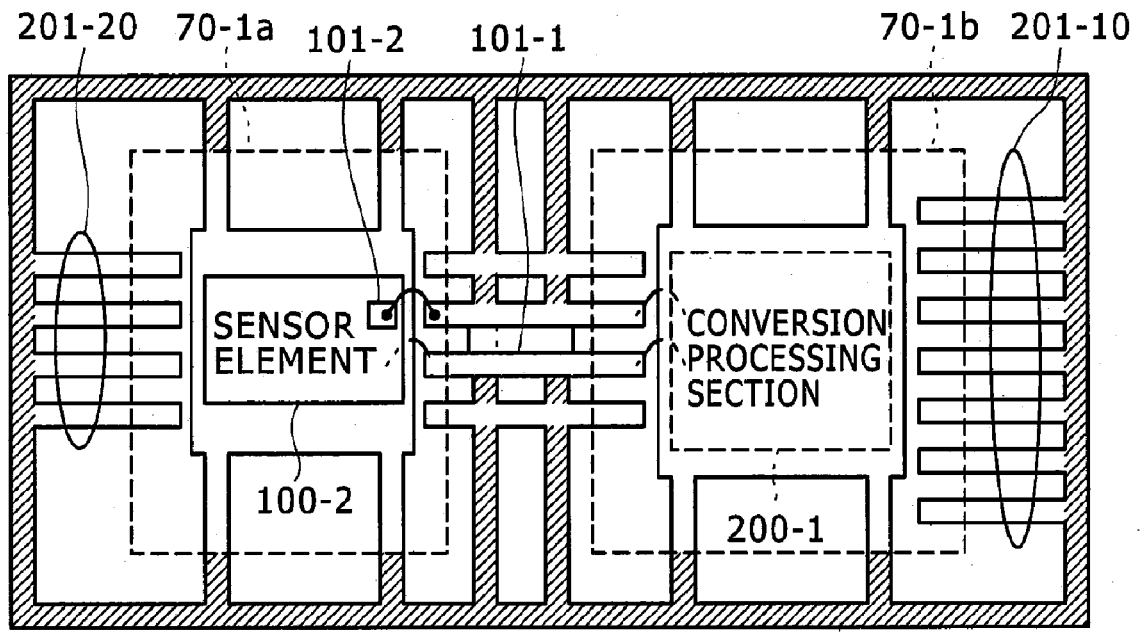

FIGS. 15A and 15B show an example configuration of the lead frame that is to realize the respective embodiment examples shown in FIGS. 5A to 6B and FIGS. 12 to 14. Hatched portions of FIGS. 15A and 15B are cut away after the first and second packages 70-1a and 70-1b have been formed. For the sake of brevity, FIGS. 15A and 15B each show only three outputs (output signals) 101-1 and 101-2 produced from the sensor elements 100-1 and 100-2.

Figure 16A:
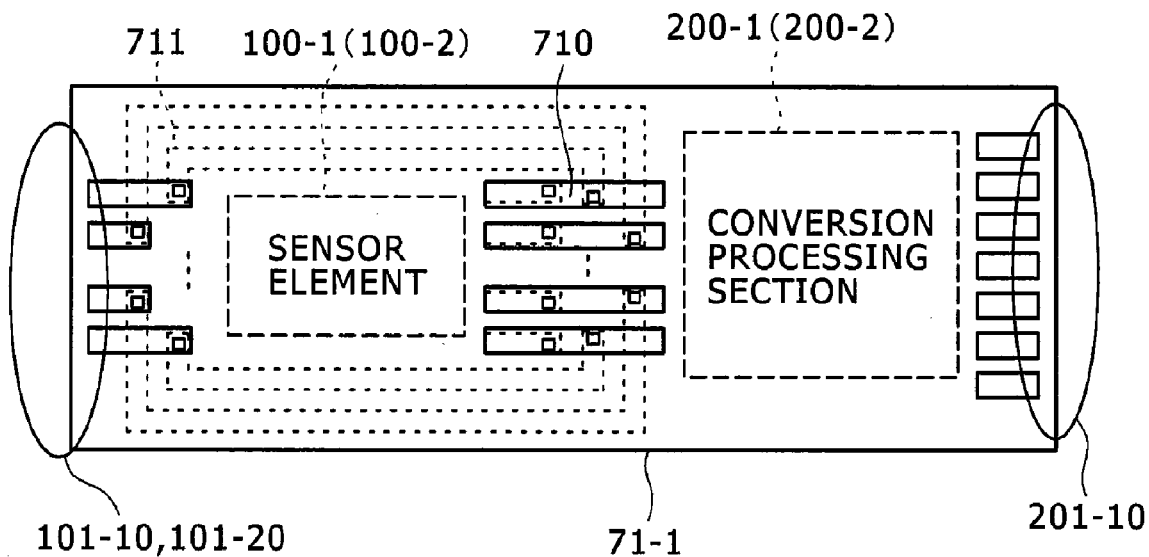
FIGS. 16A and 16B, respectively, are cross sectional views showing an example practical configuration of a physical quantity conversion sensor of the second embodiment of the present invention.
Figure 16B:
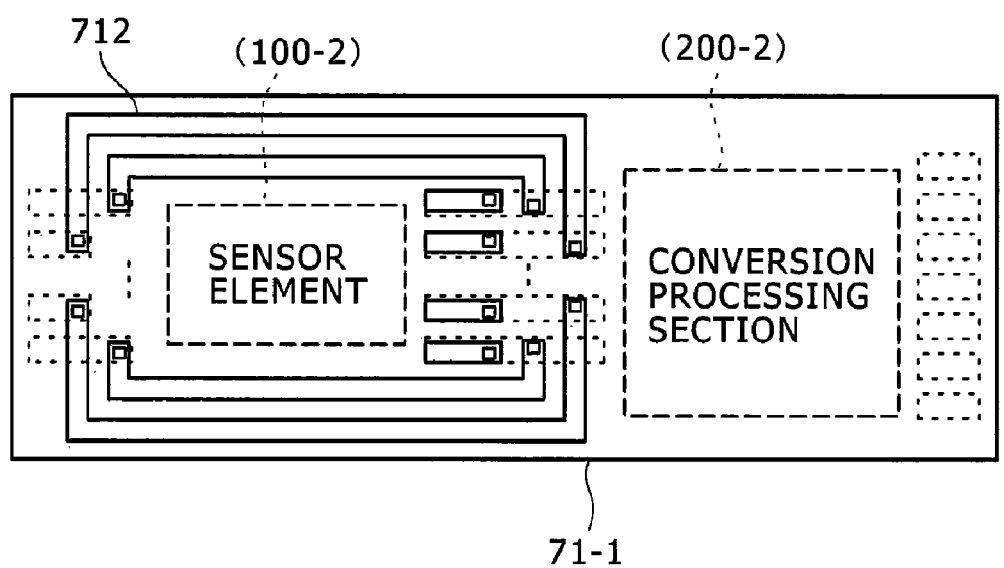

FIGS. 16A and 16B show an example configuration of the circuit board that is to realize the respective embodiment examples shown in FIGS. 2A to 4 and FIGS. 12 to 14.

Descriptions made in regard to FIGS. 2A to 4 and FIGS. 12 to 14 correspond to the case where the leads of the lead frame of the circuit board are symmetrically arranged. However, the symmetrically arrangement can be alternatively realized on the circuit board.

In the present example, wiring layers 710 and 712 are formed on two layers on the obverse and reverse sides, in which the wiring layers are interconnected through via-holes 711. In order to secure an area for mounting of the sensor element 100-2 on the reverse face, the wiring pattern on the reverse face is formed in the manner that the signals 101-1 and 101-2 are connected to the output terminals 101-10 and 101-20 signal 101-2 by circumventing the area where the sensor element 100-2 is mounted. In the case the sensor element 100-2 is not mounted or three or more wiring layers are provided, connection of the signals can be accomplished in a minimum distance, without circumventing the area of the sensor element 100-2.

Third Embodiment

Next, a redundantly configured physical quantity conversion sensor according to a third embodiment of the present invention will be described herebelow with reference to FIGS. 17 to 20.

First, a basic construction of the physical quantity conversion sensor of the present embodiment will be described with reference to FIG. 17.

Figure 17:
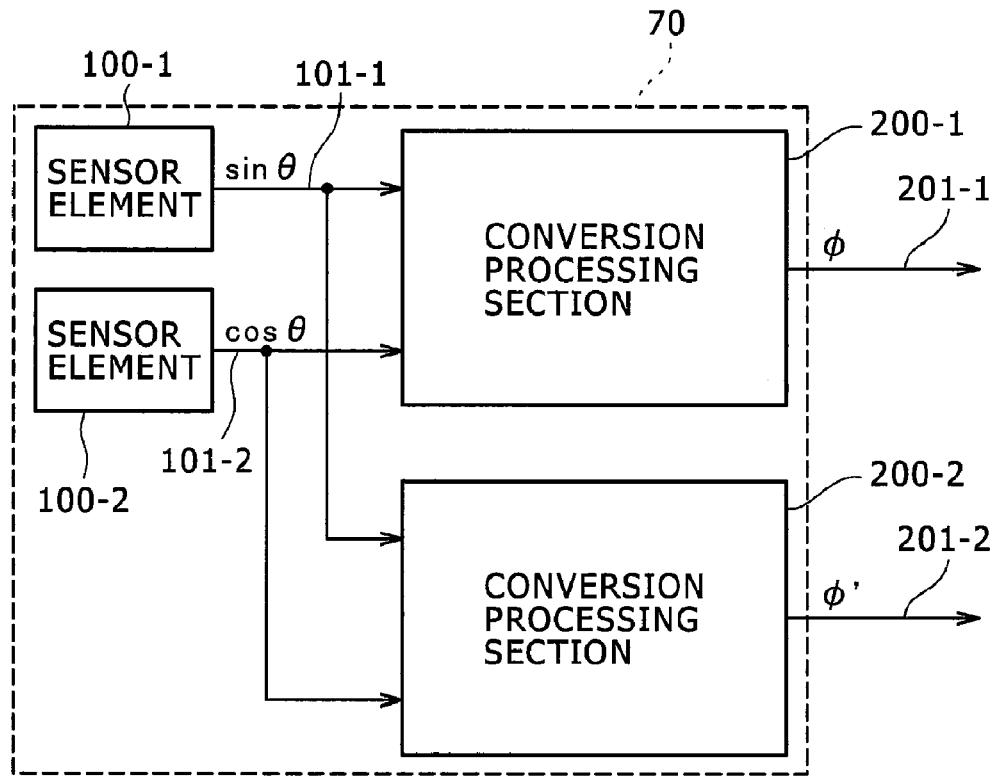
FIG. 17 is a block diagram showing a basic construction of a physical quantity conversion sensor of a third embodiment of the present invention.

FIG. 17 is a block diagram showing the basic construction of the physical quantity conversion sensor of the third embodiment of the present invention. The identical reference numerals to those of, for example, FIGS. 1 and 7, refer to the identical portions.

In the present embodiment, the sensor elements 100-1 and 100-2 and the conversion processing sections 200-1 and 200-2 are mounted in a common package 70. The configuration may be such that the conversion processing section 200-2 is mounted or is not mounted. Depending on the type of configuration, the common package or package-forming mold, and the common circuit board or lead frame are used. Thereby, the configuration can be tailored to be usable either as a redundantly configured sensor (or, "redundant sensor," hereinbelow) or as a non-redundantly configured sensor. For example, for a use case not requiring the redundancy, only the sensor elements 100-1 and 100-2 and conversion processing section 200-1 are mounted on the circuit board or lead frame. On the other hand, however, for a use case requiring the redundancy, the sensor elements 100-1 and 100-2 and the conversion processing sections 200-1 and 200-2 are mounted on the circuit board or lead frame.

Third Embodiment

Example Practical Configurations

Figure 20:
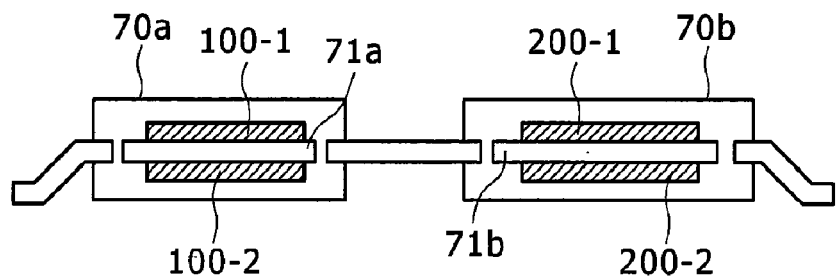
FIG. 20 is a cross sectional view showing an example practical configuration of a physical quantity conversion sensor of the third embodiment of the present invention.

Next, practical implementation examples of the physical quantity conversion sensor of the present embodiment will be described with reference to FIGS. 18 to 20.

FIGS. 18A to 20 are cross sectional view and/or plan views showing example practical configurations of physical quantity conversion sensors of the third embodiment of the present invention. In FIGS. 18A to 20, the identical reference numerals to those of FIGS. 1 to 7 and 17 refer to the identical portions throughout.

Figure 18A:
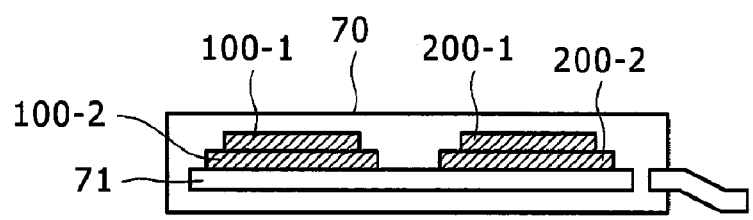
FIGS. 18A and 18B, respectively, are a cross sectional view and a plan view that show an example practical configuration of a physical quantity conversion sensor of the third embodiment of the present invention.
Figure 18B:
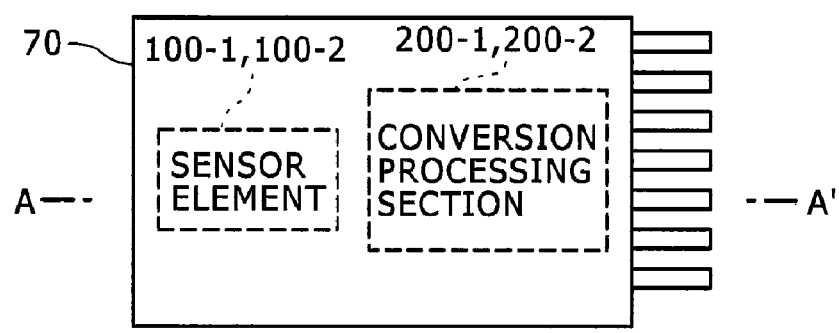

First, a first example practical configuration will be described with reference to FIGS. 18A and 18B. FIGS. 18A and 18B show the first example practical configuration of the physical quantity conversion sensor of the third embodiment of the present invention. FIG. 18A is a cross sectional view taken along the line A-A' of FIG. 18B, and FIG. 18B is a plan view.

In the present example configuration, the sensor elements 100-1 and 100-2 and conversion processing sections 200-1 and 200-2 are mounted by being laminated on the circuit board or lead frame 71-1.

Next, a second example practical configuration will be described with reference to FIG. 19. FIG. 19 is a cross sectional view showing the second example practical configuration of the physical quantity conversion sensor of the third embodiment of the present invention.

In the present example configuration, the respective sensor elements 100-1 and 100-2 and the respective conversion processing sections 200-1 and 200-2 are mounted on both sides of the circuit board or lead frame 71-1.

In the present example configuration, since the circuit board or lead frame 71-1 is interposed between the conversion processing sections 200-1 and 200-2, the degree of independence in probability of simultaneous faults, i.e., faults, in the conversion processing sections 200-1 and 200-2 is maximized.

Next, a third example practical configuration will be described herebelow with reference to FIG. 20. FIG. 20 is a cross sectional view showing the third example practical configuration of the physical quantity conversion sensor of the third embodiment of the present invention.

In the present example configuration, the sensor elements 100-1 and 100-2 and the conversion processing sections 200-1 and 200-2 can interconnected by the leads. In this configuration also, similarly as in the example configuration shown in FIG. 19, the respective sensor elements 100-1 and 100-2 and the respective conversion processing sections 200-1 and 200-2 can be mounted on both sides of the circuit board or lead frame 71-1.

Fourth Embodiment

A redundantly configured physical quantity conversion sensor according to a fourth embodiment of the present invention will be described with reference to FIGS. 21 and 22.

Figure 21:
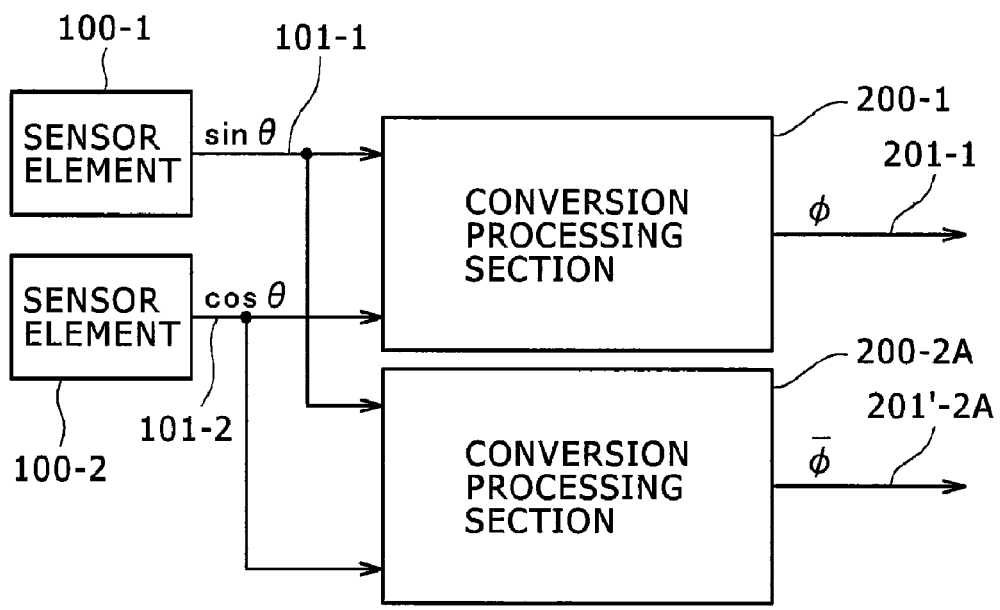
FIG. 21 is a block diagram showing a basic construction of a physical quantity conversion sensor of a fourth embodiment of the present invention.

FIG. 21 is a block diagram showing the basic construction of the physical quantity conversion sensor of the fourth embodiment of the present invention. In the drawing, the identical reference numerals in FIGS. 1, 7, and 17 refer to the identical portions. FIG. 22 is an explanatory characteristic diagram showing characteristics of the physical quantity conversion sensor of the fourth embodiment of the present invention.

As shown in FIG. 21, in the present embodiment, of redundantly provided conversion processing sections 200-1 and 200-2A, the estimated value $\phi 201\text{-}l$ of the rotation angle $\theta$ is output from the conversion processing section 200-1, and an negative value $(-\phi)201'\text{-}2A$ of the estimated value is output from the conversion processing section 200-2A. In the event that the output of the conversion processing section 200-1 varies from 0 minimum to 1024, the conversion processing section 200-2A first computes the estimated value $\phi 201$ of the rotation angle $\theta$, similarly as the conversion processing section 200-1. Then, the conversion processing section 200-2A further performs the process of subtracting the estimated value $\phi 201\text{-}l$ from 1024, thereby being able to obtain and output the negative value $(-\phi)201'\text{-}2A$.

Figure 22:
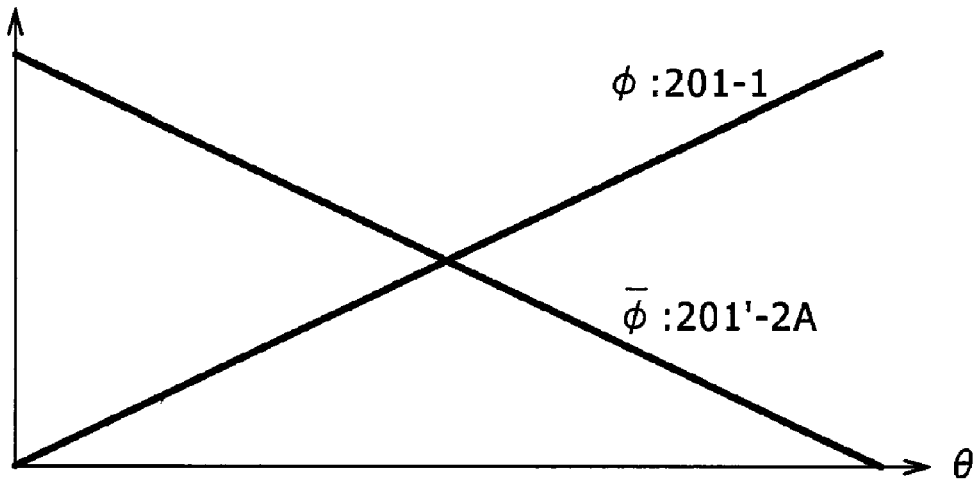
FIG. 22 is an explanatory characteristic diagram showing the characteristics of the physical quantity conversion sensor of the fourth embodiment of the present invention.

FIG. 22 shows the relationship between the rotation angle $\theta$, the estimated value $\phi 201\text{-}l$ thereof, and the negative value $(-\phi)201'\text{-}2A$ thereof.

According to the present embodiment, even in the event that the conversion processing section 200-1, 200-2A has produced same outputs including an error resulting from, for example, a design related weak point, one of them is not the negative value thereof, so that the error can be detected. Consequently, the effect of double errors resulting from, for example, design related weak point can be prevented.

Further, as shown in FIGS. 11, 13, 19, and 20, the wiring patterns of the circuit board, the leads of the lead frame, and pads are symmetrically arranged, so that the connectability between the sensor elements 100-1 and 100-2 and the conversion processing sections 200-1 and 200-2 is enhanced. Consequently, connection therebetween can be accomplished through the wiring pattern of the single layer, which is the minimum number of layers, and consequently cost reduction can be achieved.

Fifth Embodiment

A redundantly configured physical quantity conversion sensor according to a fifth embodiment of the present invention will be described with reference to FIGS. 23 and 24.

Figure 23:
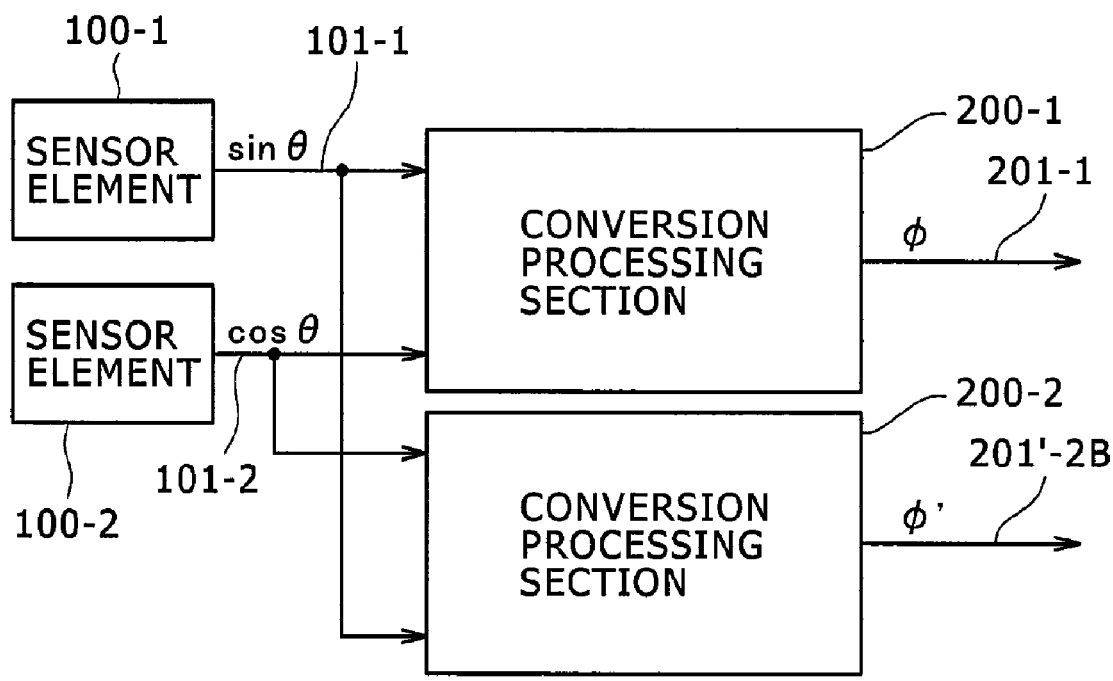
FIG. 23 is a block diagram showing a basic construction of a physical quantity conversion sensor of a fifth embodiment of the present invention.

FIG. 23 is a block diagram showing the basic construction of the physical quantity conversion sensor of the fifth embodiment of the present invention. In the drawing, the identical reference numerals in FIGS. 1, 7, and 17 refer to the identical portions. FIG. 24 is an explanatory characteristic diagram showing characteristics of the physical quantity conversion sensor of the fifth embodiment of the present invention.

In the present embodiment, the signals are input to the conversion processing section 200-1, as follows:

the signal 101-1 proportional to the sine ("sin") from the sensor element 100-1 is input to a SIN signal input terminal of the conversion processing section 200-1; and the signal 101-2 proportional to the cosine ("cos") from the sensor element 100-2 is input to a COS signal input terminal of the conversion processing section 200-1.

On the other hand, signals are input to the conversion processing section 200-2, as follows:

the signal 101-2 proportional to the cosine ("cos") from the sensor element 100-2 is input to a SIN signal input terminal of the conversion processing section 200-2; and the signal 101-1 proportional to the sine ("sin") from the sensor element 100-1 is input to a COS signal input terminal of the conversion processing section 200-2.

Thus, as compared to the examples such as shown in FIGS. 7 and 17, the signals input to the SIN signal input terminal and COS signal input terminal of the conversion processing section 200-2 are reverse to those in the examples such as shown in FIGS. 7 and 17.

The present embodiment can be applied to the conversion processing sections 200-1 and 200-2 shown in FIGS. 11, 13, 19, and 20.

An output φ of the conversion processing section 200-1 is represented as $$\varphi = a\tan(\sin\theta/\cos\theta)$$
$$= a\tan(\tan\theta)$$
$$= \theta$$

The conversion processing section 200-2 executes a process similar to that of the conversion processing section 200-1. However, since the input signals are reverse, an output φ' is represented as $$\varphi' = a\tan(\cos\theta/\sin\theta)$$
$$= a\tan(\cot\alpha n\theta)$$
$$= \pi/2 - \theta$$

Figure 24:
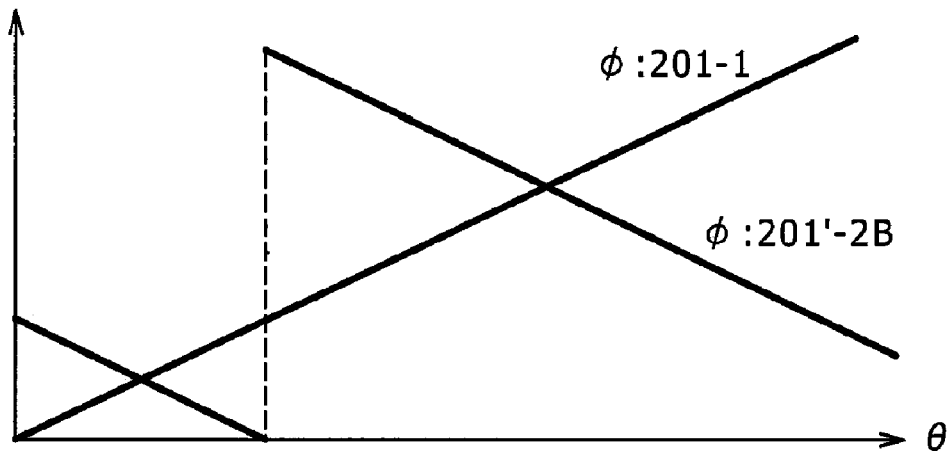
FIG. 24 is an explanatory characteristic diagram showing the characteristics of the physical quantity conversion sensor of the fifth embodiment of the present invention.

FIG. 24 shows the output φ, 201-1 in relation to θ, of the conversion processing section 200-1, and the output φ', 201-2B in relation to θ, of the conversion processing section 200-2.

According to the present embodiment, similarly as in the embodiment examples shown in FIGS. 11, 13, 19, and 20, the wiring patterns of the circuit board, the leads of the lead frame, and pads are symmetrically arranged, so that the connectability between the sensor elements 100-1 and 100-2 and the conversion processing sections 200-1 and 200-2 is enhanced. Consequently, connection therebetween can be accomplished through the wiring pattern of the single layer, which is the minimum number of layers, and consequently cost reduction can be achieved.

Sixth Embodiment

A redundantly configured physical quantity conversion sensor according to a sixth embodiment of the present invention will be described with reference to FIG. 25.

Figure 25:
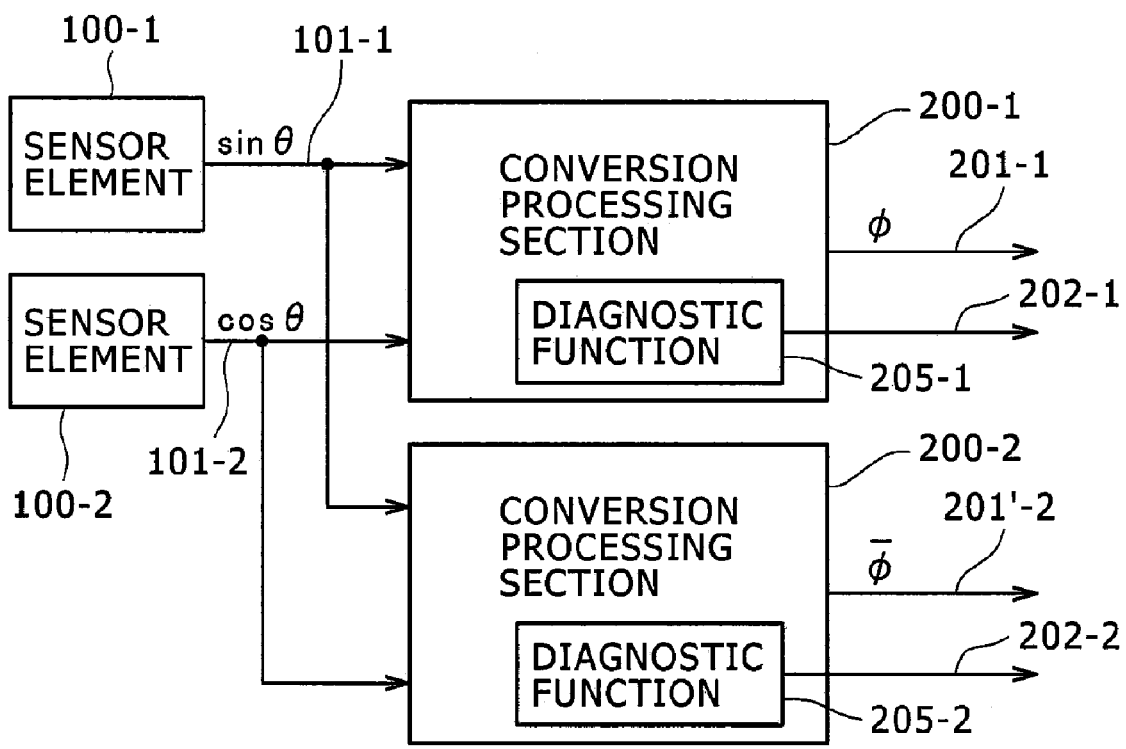
FIG. 25 is a block diagram showing a basic construction of a physical quantity conversion sensor of a sixth embodiment of the present invention.

FIG. 25 is a block diagram showing the basic construction of the physical quantity conversion sensor of the sixth embodiment of the present invention. In the drawing, the identical reference numerals in FIGS. 1, 7, and 17 refer to the identical portions.

In the present embodiment, the conversion processing sections 200-1 and 200-2, respectively, include diagnostic function sections 205-1 and 205-2. The diagnostic function sections 205-1 and 205-2, respectively, output diagnosis results 202-1 and 202-2.

As diagnosis contents of the diagnostic function sections 205-1 and 205-2, those as described in, for example, Japanese Patent Application No. 2006-307317 submitted in the past are utilized. The diagnostic function sections 205-1 and 205-2, respectively, provide the contents of processing that are substantially the same as the contents of conversion processing in the conversion processing sections 200-1 and 200-2. The diagnostic function sections 205-1 and 205-2 perform simplified conversion processes. More specifically, the diagnostic function sections 205-1 and 205-2, respectively, perform comparison between the results of the conversion processes in the conversion processing sections 200-1 and 200-2 and the results of the their own simplified conversion processes, and determine the comparison results to be normal when matches are attained between the results of the simplified conversion processes.

(Sensor Element Configuration in Respective Embodiments)

The configurations of the sensor elements as used and for use in the physical quantity conversion sensors of the respective embodiments of the present invention will be described herebelow with reference to FIGS. 26A to 26D.

FIGS. 26A to 26D are explanatory views of sensor elements as used and for use in the physical quantity conversion sensors of the respective embodiments of the present invention.

The sensor elements 100-1 and 100-2 each use giant magnetic resistance (GMR) elements. However, magnetic resistance (MR) elements can be displaced by the GMR elements. Description herebelow refers to the GMR elements to be inclusive of the MR elements.

Figure 26A:
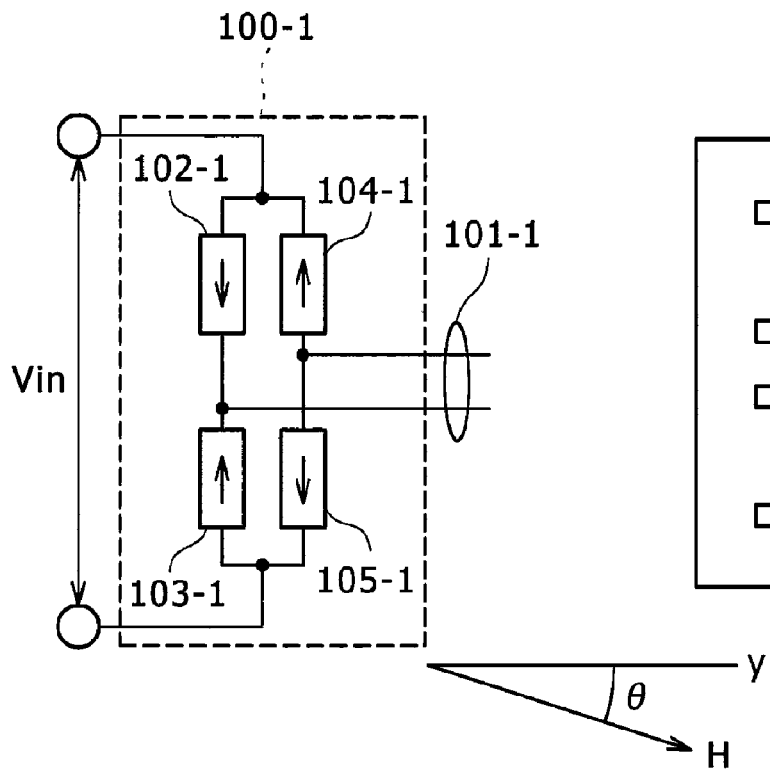
FIGS. 26A to 26D, respectively, are explanatory views showing sensor elements used in the physical quantity conversion sensors of the respective embodiments of the present invention.
Figure 26B:
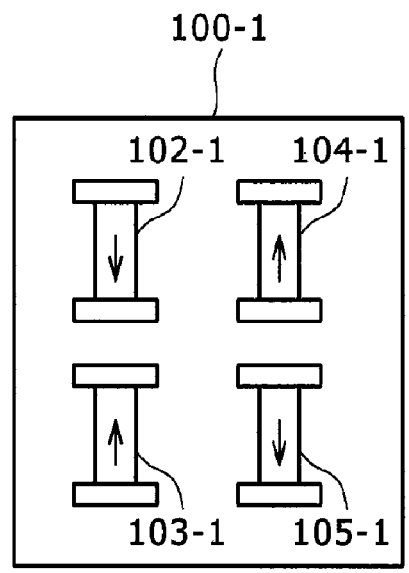
Figure 26C:
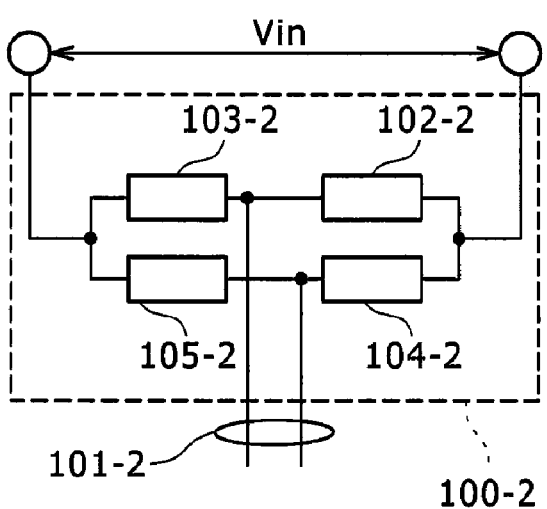

With reference to FIG. 26B, the sensor element 100-1 includes GMR elements 102-1, 103-1, 104-1, and 105-1 that are formed on a non-magnetic substrate into a predetermined pattern as illustrated in the drawing figure. As shown in FIG. 26A, the respective GMR elements 102-1, 103-1, 104-1, and 105-1 are wire-connected together, thereby to form a first Wheatstone Bridge circuit. More specifically, the first Wheatstone Bridge circuit is formed to include the four GMR elements 102-1, 103-1, 104-1, and 105-1 that respectively include fixed magnetic layers whose magnetization directions are fixed to the directions of ±90 degrees with respect to a reference direction y of the rotation angle.

Figure 26D:
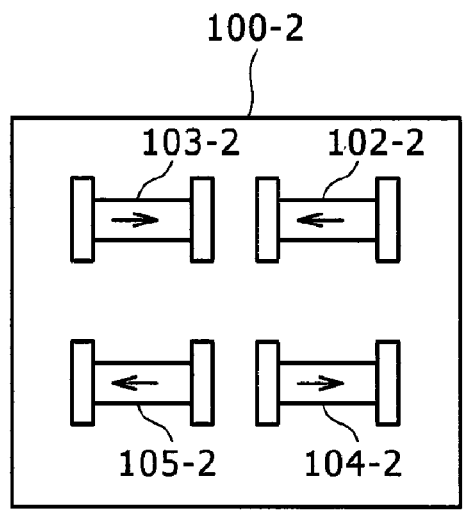

With reference to FIG. 26D, GMR elements 102-2, 103-2, 104-2, and 105-2 are formed on a non-magnetic substrate into a predetermined pattern as illustrated in the drawing figure. As shown in FIG. 28C, the respective GMR elements 102-2, 103-2, 104-2, and 105-2 are wire-connected together, thereby to form a second Wheatstone Bridge circuit. More specifically, the second Wheatstone Bridge circuit is formed to include the four GMR elements 102-2, 103-2, 104-2, and 105-2 that respectively include fixed magnetic layers whose magnetization directions are set to parallel and/or nonparallel directions.

While the fixed magnetic layer is invariant in magnetization direction, the magnetization direction of a free magnetic layer follows the direction of an external magnetic field H. A resistance value of the GMR element is reliant to an angle difference a between the magnetization directions of the fixed magnetic layer and the free magnetic layer, and varies in proportion to $(1-\cos\alpha)$.

Accordingly, a signal 101-1 proportional to $Vin \cdot \sin(\theta)$ is obtained in the first Wheatstone Bridge circuit that constitutes the sensor element 100-1. Similarly, a signal 101-2 proportional to $Vin \cdot \cos(\theta)$ (where Vin=input voltage) is obtained in the second Wheatstone Bridge circuit that constitutes the sensor element 100-2.

More specifically, the sensor elements 100-1 and 100-2, respectively, output the signal 101-1 proportional to the sine ("sin") and the signal 101-2 proportional to the cosign ("cos"). That is, the sensor elements 100-1 and 100-2, respective, output the signals related to one another. A DC (direct current) voltage is used as the input voltage Vin that is applied to the sensor elements 100-1 and 100-2.

The sensor elements 100-1 and 100-2 are arranged in the extension direction of, for example, a rotation shaft of a rotator (a rotation shaft of a motor (FIG. 46)) or a rotation shaft (FIG. 49) of a throttle valve. The sensor elements 100-1 and 100-2 are arranged to overlap with one another along the extension direction of the rotation shaft of the rotator. Further, a magnet (FIG. 44) that rotates with a rotation shaft is provided to an end portion of the rotation shaft of the rotator. Through detection of the direction of magnetic force lines of the magnet, the sensor elements 100-1 and 100-2 are enabled to detect the rotation angle θ of the rotation shaft of the rotator.

Seventh Embodiment

A redundantly configured physical quantity conversion sensor according to a seventh embodiment of the present invention will be described with reference to FIG. 27.

Figure 27:
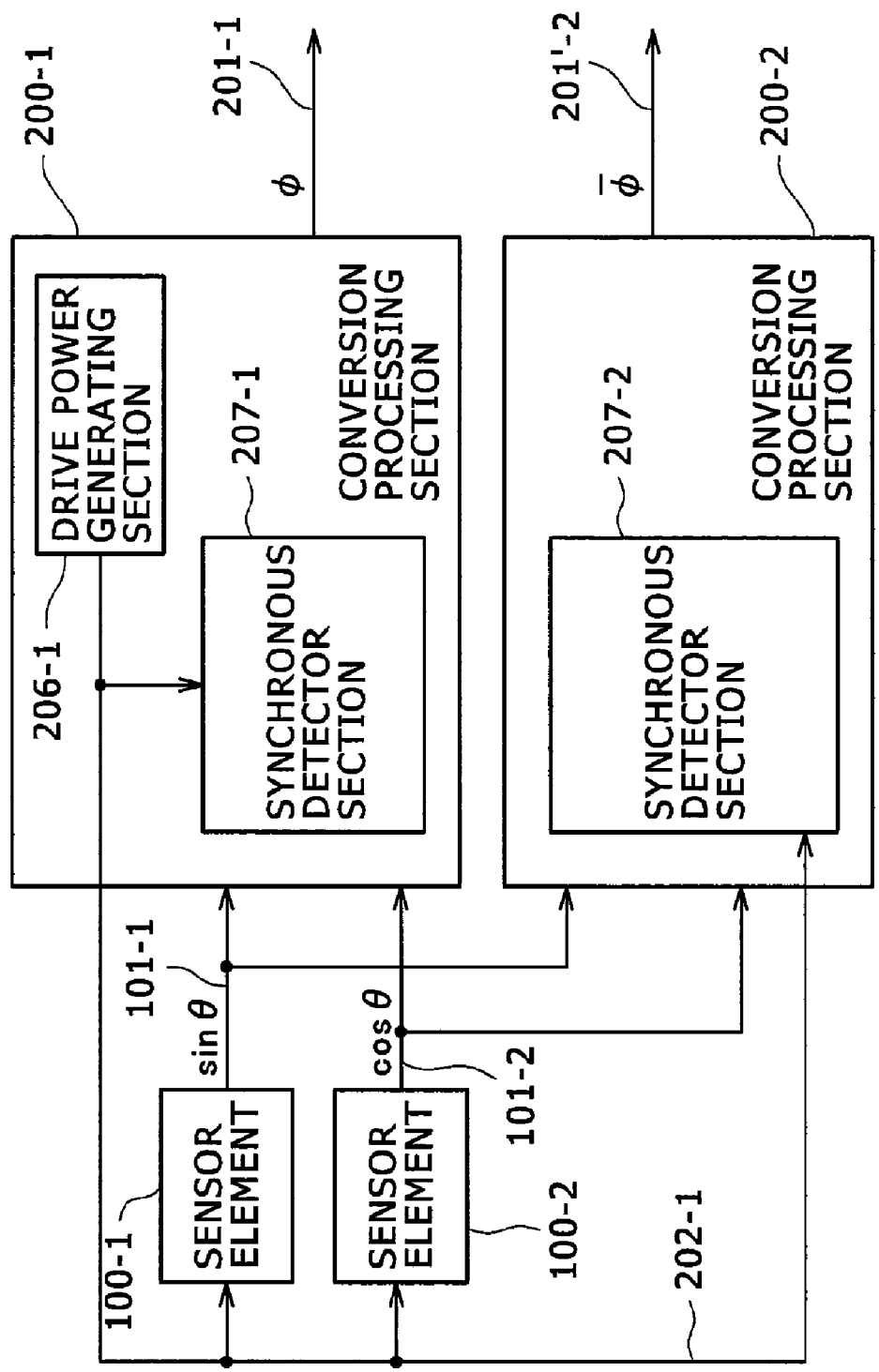
FIG. 27 is a block diagram showing a basic construction of a physical quantity conversion sensor of a seventh embodiment of the present invention.

FIG. 27 is a block diagram showing the basic construction of the physical quantity conversion sensor of the seventh embodiment of the present invention. In the drawing, the identical reference numerals in FIGS. 1, 7, and 17 refer to the identical portions.

In the present embodiment, the conversion processing section 200-1 includes a drive power generating section 206-1. The drive power generating section 206-1 outputs a drive power F(t), thereby to drive the respective sensor element 100-1, 100-2. The drive power F(t) is a cycle function, such as a sinusoidal wave voltage.

Further, the conversion processing section 200-1 includes a synchronous detector section 207-1, and the conversion processing section 200-2 includes a synchronous detector section 207-2. In accordance with the detection of the output of the respective sensor element 100-1, 100-2 by the synchronous detector section 207-1, 207-2, the respective conversion processing section 200-1, 200-2 is enabled to increase the S/N ratio. Further, with the use of the synchronous detection method, even when the drive power F(t) is set to a low current or power, a predetermined S/N ratio can still be obtained. This makes it possible to reduce migration and heat associated with the drive power F(t) in the respective sensor element 100-1, 100-2, consequently making it achieving an increase in the service life thereof.

Eighth Embodiment

A redundantly configurable quantity conversion sensor of an eighth embodiment of the present invention will be described with reference to FIGS. 28 to 31.

Figure 28:
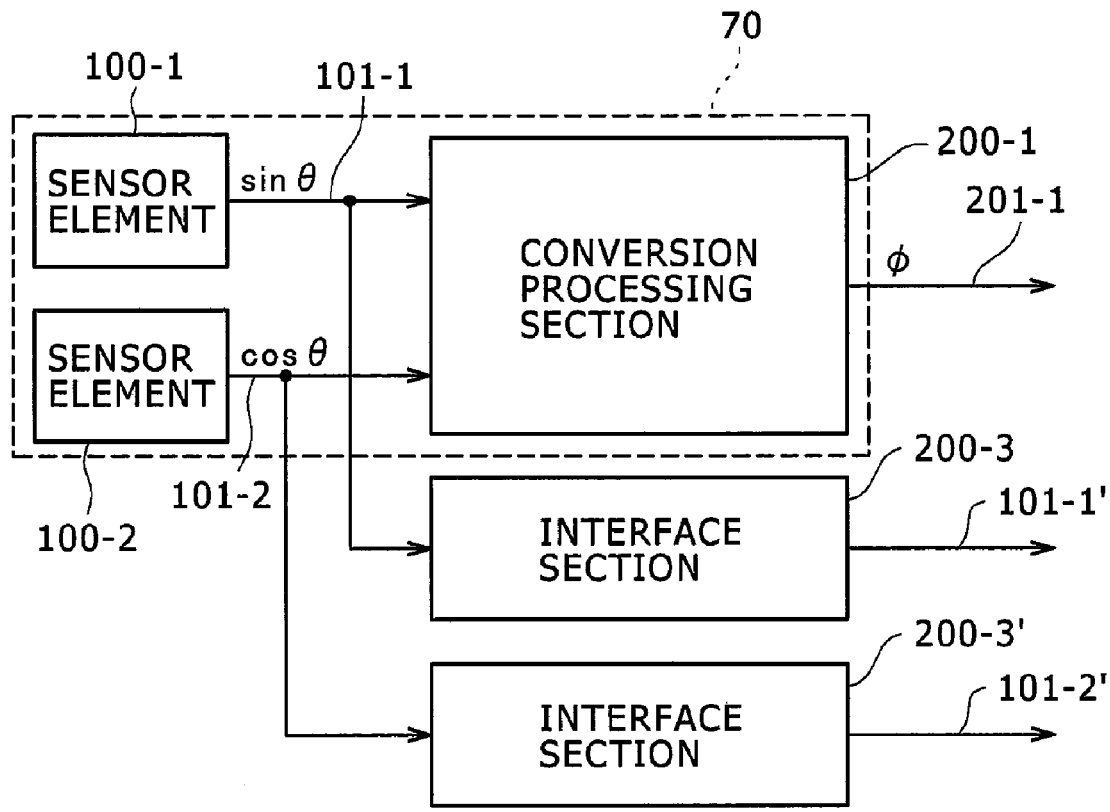
FIG. 28 is a block diagram showing a basic construction of a physical quantity conversion sensor of an eighth embodiment of the present invention.
Figure 29:
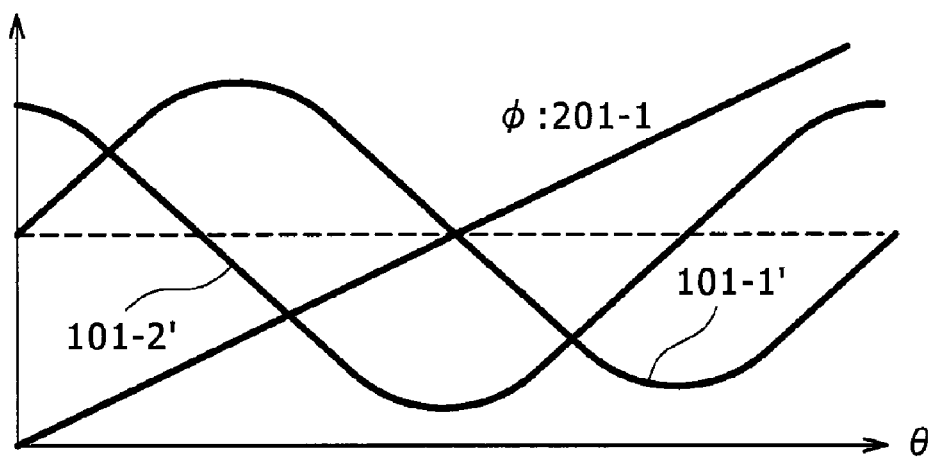
FIG. 29 is a characteristic diagram showing the characteristics of the physical quantity conversion sensor of the eighth embodiment of the present invention.
Figure 30:
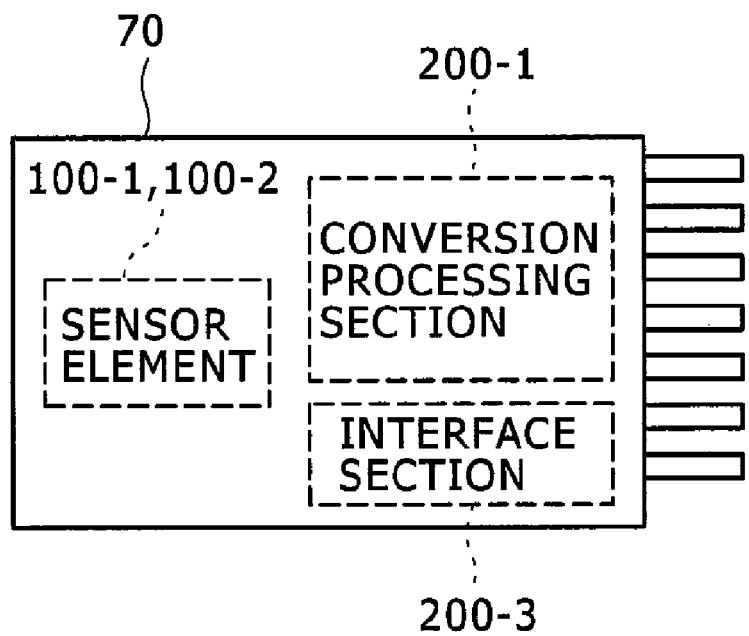
FIG. 30 is a plan view showing an example implementation configuration of a physical quantity conversion sensor of the eighth embodiment of the present invention.
Figure 31:
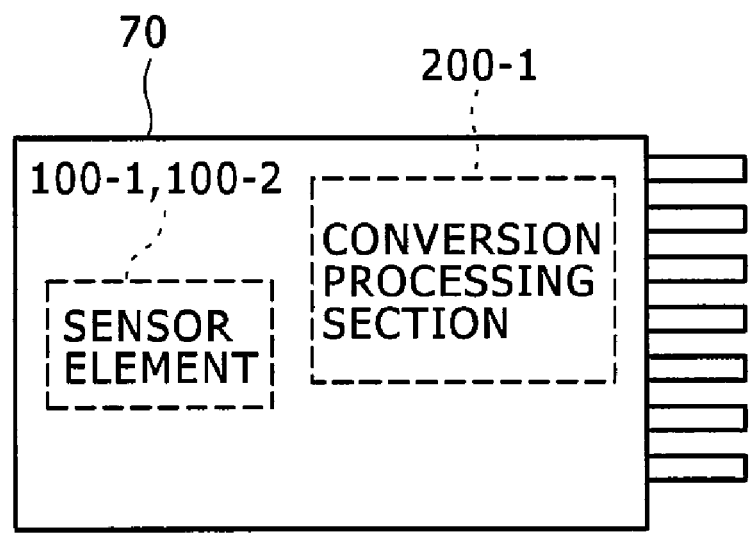
FIG. 31 is a plan view showing another example implementation configuration of a physical quantity conversion sensor of the eighth embodiment of the present invention.

FIG. 28 is a block diagram showing the basic construction of the physical quantity conversion sensor of the eighth embodiment of the present invention. In the drawing, the identical reference numerals in FIGS. 1, 7, and 17 refer to the identical portions. FIG. 29 is a characteristic diagram showing the characteristics of the physical quantity conversion sensor of the eighth embodiment of the present invention. FIG. 30 is a plan view showing an implementation configuration of the physical quantity conversion sensor of the eighth embodiment of the present invention. FIG. 31 is a plan view showing another implementation configuration of the physical quantity conversion sensor of the eighth embodiment of the present invention.

In the present embodiment, as shown in FIG. 28, both of the signal 101-1 proportional to the sine ("sin") from sensor element 100-1 and the signal 101-2 proportional to the cosign ("cos") from the sensor element 100-2 are output as outputs 101-1' and 101-2' of the respective interface sections 200-3 and 200-3' (or, "interface section outputs) through interface sections 200-3 and 200-3'. The interface sections 200-3 and 200-3' are amplifiers, for example. However, the configuration may be such that any one of the such that one of the signal 101-1 proportional to the sine ("sin") from sensor element 100-1 and the signal 101-2 proportional to the cosign ("cos") from the sensor element 100-2 is output.

FIG. 29 shows the relationship between the output of the conversion processing section 200-1 and interface section outputs 101-1' and 101-2' in relation to the rotation angle θ.

The outputs 101-10' and 101-2' of the interface sections 200-3 and 200-3' are input into a microprocessing unit, for example, as described further below (in FIG. 45). The microprocessing unit executes conversion processes through computation processing to thereby obtain an output similar to the output (201-1 of the conversion processing section 200-1 in relation to the rotation angle θ, whereby the configuration can be formed into the redundant configuration.

Although, in FIG. 28, the interface sections 200-3 and 200-3' are mounted outside the package 70, they may be mounted inside of the package 70, as shown in FIG. 30. That is, the sensor elements 100-1 and 100-2 and interface sections 200-3 and 200-3' can be mounted within the single package 70.

Further, as shown in FIG. 31, the configuration is formed such that the interface section 2003-3 is not mounted. In this case, the configuration can be tailored to be usable as the redundant/non-redundant configuration by use of the common package or package-forming mold and a common circuit board or lead frame. For example, for a use case not requiring the redundancy, only the sensor elements 100-1 and 100-2 and conversion processing section 200-1 can be mounted on the circuit board or lead frame. On the other hand, however, for a use case requiring the redundancy operation, the sensor elements 100-1 and 100-2, the conversion processing sections 200-1 and 200-2, and the interface sections 200-3 and 200-3' can be mounted on the circuit board or lead frame.

Ninth Embodiment

A redundantly configurable quantity conversion sensor of a ninth embodiment of the present invention will be described with reference to FIGS. 32 to 39.

Figure 32:
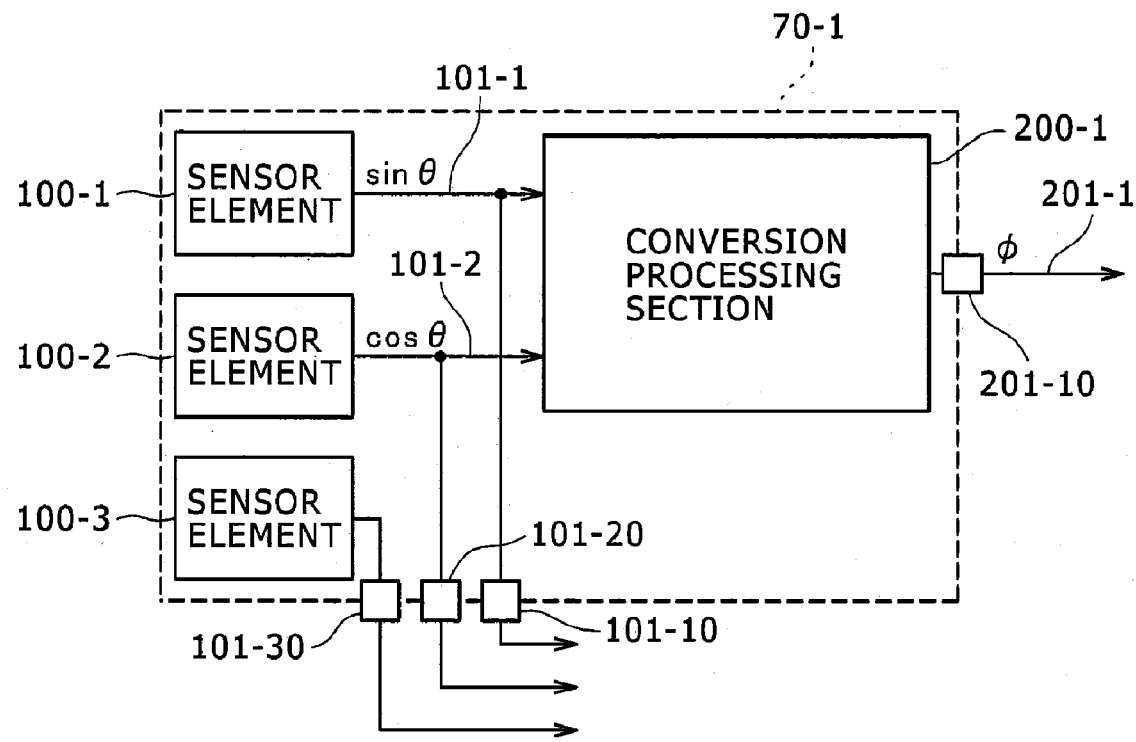
FIG. 32 is a block diagram showing a basic construction of a physical quantity conversion sensor of a ninth embodiment of the present invention.
Figure 33:
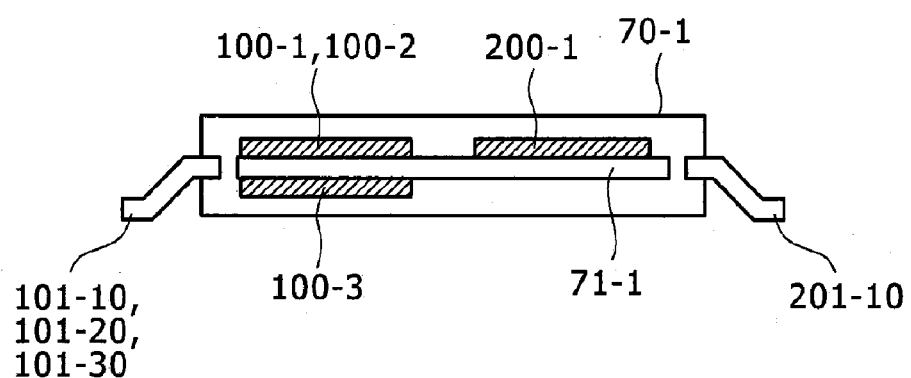
FIG. 33 is a cross sectional view showing a basic construction of the physical quantity conversion sensor of the ninth embodiment of the present invention.

FIG. 32 is a block diagram showing the basic construction of the physical quantity conversion sensor of the ninth embodiment of the present invention. FIG. 33 is a cross sectional view showing the basic construction of the physical quantity conversion sensor of the ninth embodiment of the present invention. In the drawings, the identical reference numerals in FIGS. 1, 7, and 17 refer to the identical portions.

In the present embodiment, as shown in FIG. 32, the package 70-1 includes a third sensor element 100-3 in addition to the first and second sensor elements 100-1 and 100-2. Similar to the respective first and second elements 100-1 and 100-2, the third sensor element 100-3 outputs a signal 101-3 proportional to the rotation angle θ or the multiple thereof, that is, the sine ("sin") or cosign ("cos").

In this connection, the package 70-1 includes an output terminal 101-30 to output the signal 101-3, which is proportional to the sine ("sin") or cosign ("cos"), to the outside of the package 70-1.

Alternatively, the configuration may by such that the first and second sensor elements 100-1 and 100-2 are formed on the first package 70-1, and an area for mounting of the third sensor element 100-3 is provided in a second package.

As shown in FIG. 33, leads extended from the side of the package 70-1 where the sensor elements 100-1, 100-2, and 100-3 are used as the output terminals 101-10 to 101-30. That is, the output terminal 101-10 outputs the signal 101-1 proportional to the sine ("sin"), the output terminal 101-20 outputs the signal 101-2 proportional to the cosine ("cos"), and the output terminal 101-30 outputs the signal 101-3 proportional to the sine ("sin") or the cosine ("cos"). Further, in the shown example, the sensor element 100-2 is mounted in a chip separated from the respective sensor elements 100-1 and 1002, and the elements are mounted on both sides of the circuit board or lead frame 71-1. However, the sensor elements may be laminated on the lead frame 71-1.

Since the circuit board or lead frame 71-1 is interposed, the degree of independence in probability of simultaneous faults, that is, the degree of independence in faults in the third sensor element 100-3 and the sensor elements 100-1 and 100-2 is maximized. Even in the case of lamination on the lead frame 71-1, the degree of independence in faults can be reduced.

Further, the sensor elements 100-1 and 100-2 are provided in one chip, the positional, angular misalignment between the sensor elements 100-1 and 100-2 can be minimized.

As described above, in the present embodiment, compatibility can be achieved between degree of independence in probability of simultaneous faults, i.e., faults, in the sensor elements and the positional, angular misalignment, i.e., inter-sensor element accuracy.

Further, the configuration may be formed in the manner that a space for mounting the third sensor element 100-3 and a wire-bonding space for extending the signal lines are preliminarily provided on the lead frame 71-1, and the third sensor element 100-3 is mounted only when sensor element redundancy is necessary. In this case, in the event the redundancy is not necessary, cost increases can be restrained, thereby making it possible to provide sensors at costs corresponding to required reliability.

The output terminal 101-30 for outputting the signal 101-3 proportional to the sine ("sin") or the cosine ("cos") can be formed into the configuration shown in, for example, FIGS. 5A and 5B or 6(A) or 6(B). That is, the signal 101-3 can be configured similarly as the output terminal 101-10 that outputs the signal 101-1 proportional to the sine ("sin") or the output terminal 101-20 proportional to the cosine ("cos").

Ninth Embodiment

Example Practical Configurations

Example practical configurations of redundantly configured quantity conversion sensors of the present embodiment of the present invention will be described herebelow with reference to FIGS. 34 to 36.

To begin with, a first example practical configuration of the redundantly configured quantity conversion sensor of the present embodiment will be described herebelow with reference to FIG. 34.

Figure 34:
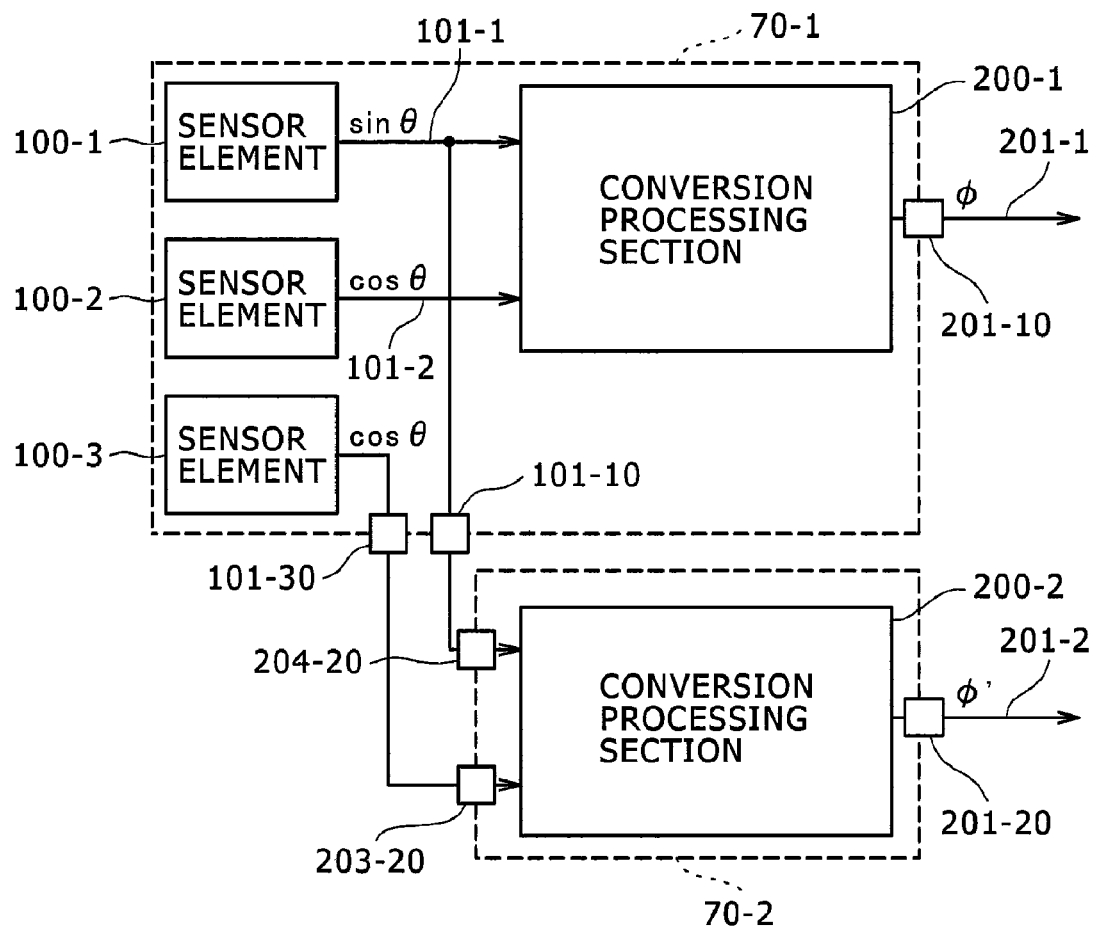
FIG. 34 is a block diagram showing a first example configuration of a redundantly configured physical quantity conversion sensor of the ninth embodiment of the present invention.

FIG. 34 is a block diagram showing the first example practical configuration of the redundantly configured physical quantity conversion sensor of the ninth embodiment of the present invention. In the drawing, the identical reference numerals in FIGS. 1, 7, and 17 refer to the identical portions.

In the example practical configuration, the output terminals 101-10, 101-3 are provided. Hence, in addition to the conversion processing section 200-1 in the package 70-1, the conversion processing section 200-2 mounted in the second package 70-2 is provided, thereby to form the configuration into the redundant configuration. In the example practical configuration, the third sensor element 100-3 outputs the signal 101-3 proportional to the cosign ("cos").

Next, a second example practical configuration of the redundantly configured quantity conversion sensor of the present embodiment will be described herebelow with reference to FIGS. 35 and 36.

Figure 35:
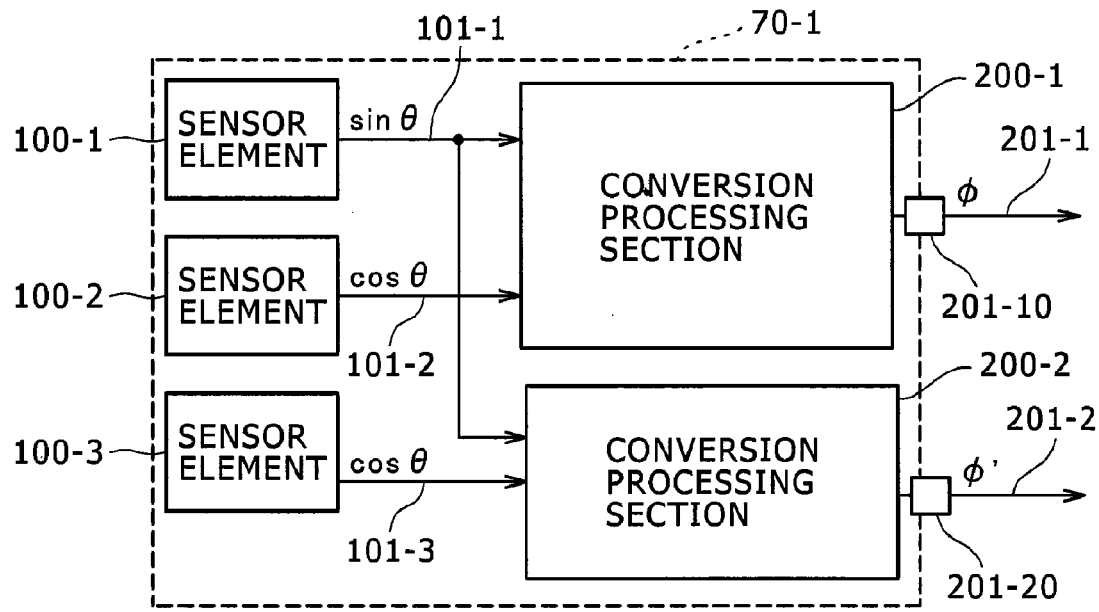
FIG. 35 is a block diagram showing the first example configuration of the redundantly configured physical quantity conversion sensor of the ninth embodiment of the present invention.
Figure 36:
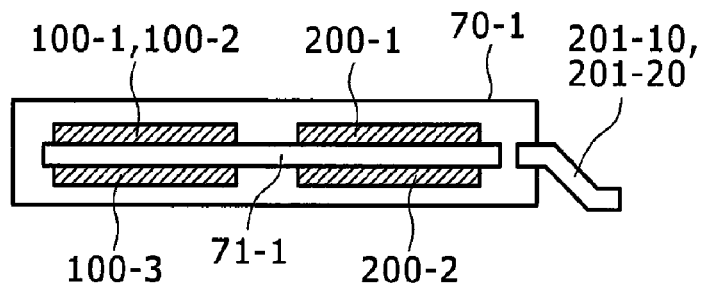
FIG. 36 is a cross sectional view showing the first example configuration of the redundantly configured physical quantity conversion sensor of the ninth embodiment of the present invention.

FIG. 35 is a block diagram showing the first example practical configuration of the redundantly configured physical quantity conversion sensor of the ninth embodiment of the present invention. FIG. 36 is a cross sectional view showing the first example practical configuration of the redundantly configured physical quantity conversion sensor of the ninth embodiment of the present invention. In the drawing, the identical reference numerals in FIGS. 1, 7, and 17 refer to the identical portions.

In the present example practical configuration, the sensor elements 100-1 to 100-3 and conversion processing sections 200-1 and 200-2 are mounted in the common package 70-1. Further, the configuration may be formed in the manner that spaces for mounting of the third sensor element 100-3 and the conversion processing section 200-2 and a wire-bonding space for extending the signal lines are preliminarily provided on the lead frame 71-1. Then, the third sensor element 100-3 and the conversion processing section 200-2 are mounted only when the redundancy of the conversion processing section is necessary. In this case, in the event the redundancy is not necessary, cost increases can be restrained, thereby making it possible to provide sensors at costs corresponding to required reliability.

Next, an example configuration of the redundantly configurable quantity conversion sensor of the present embodiment will be described herebelow with reference to FIG. 37.

Figure 37:
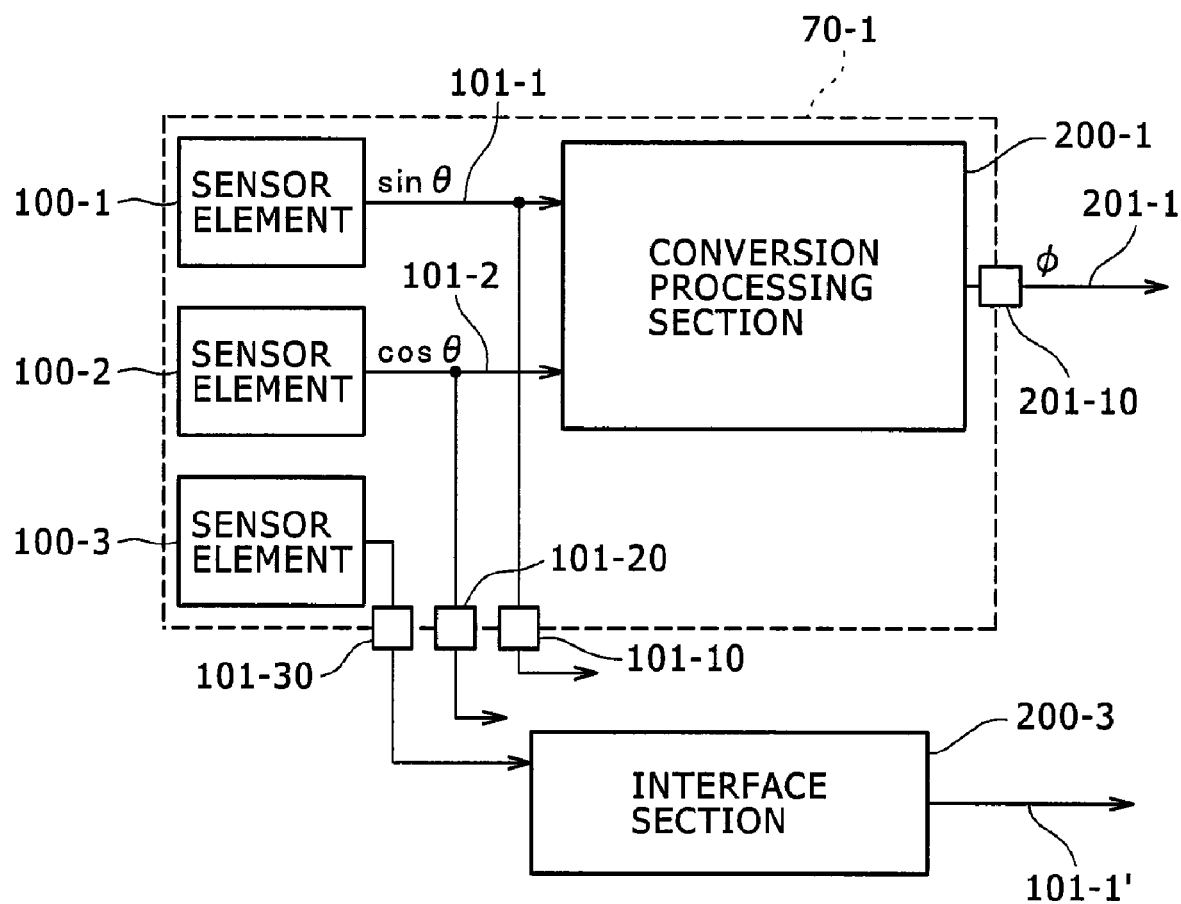
FIG. 37 is a cross sectional view showing an example configuration of a redundantly configurable physical quantity conversion sensor of the ninth embodiment of the present invention.

FIG. 37 is a block diagram showing the example configuration of the redundantly configurable physical quantity conversion sensor of the ninth embodiment of the present invention. In the drawing, the identical reference numerals in FIGS. 1, 7, and 17 refer to the identical portions.

In the present example configuration, an interface section 200-3 mounted outside of the package 70-1 is added in addition to the conversion processing section 200-1 located inside of the package 70-1. As described further below, the interface section 200-3 sends an input(s) into the microprocessing unit as described further below (in FIG. 45). The microprocessing unit executes conversion processes through computation processing to thereby obtain an output similar to the output φ201-1 of the conversion processing section 200-1 in relation to the rotation angle θ, whereby the configuration can be formed into the redundant configuration.

Next, another example configuration of the redundantly configurable quantity conversion sensor of the present embodiment will be described herebelow with reference to FIGS. 38 and 39.

Figure 38:
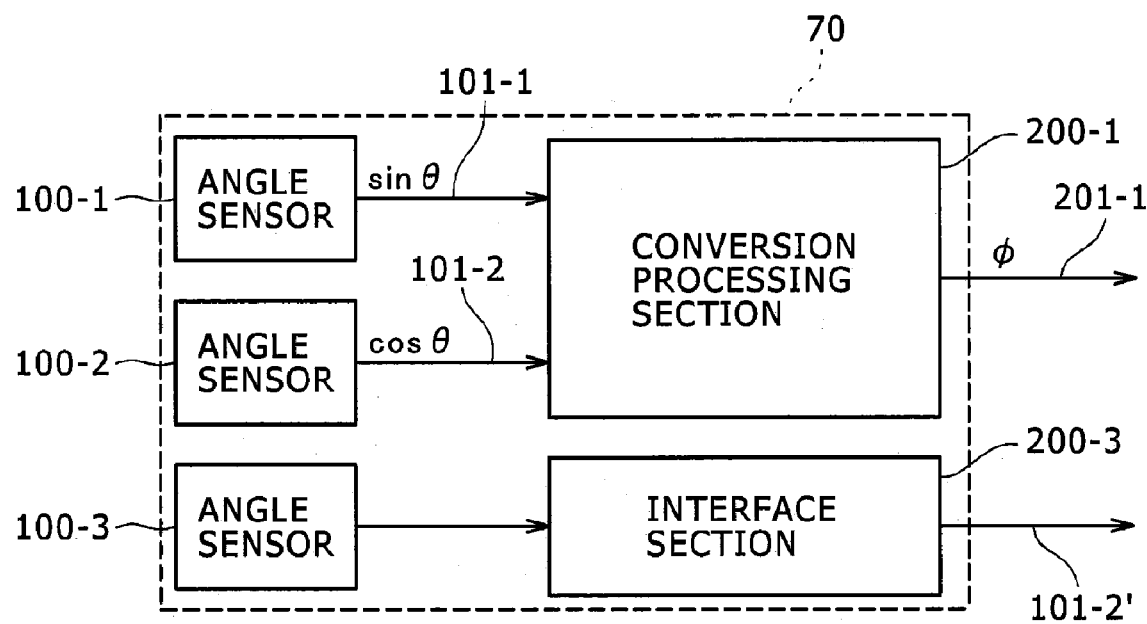
FIG. 38 is a cross sectional view showing another example configuration of a redundantly configurable physical quantity conversion sensor of the ninth embodiment of the present invention.
Figure 39:
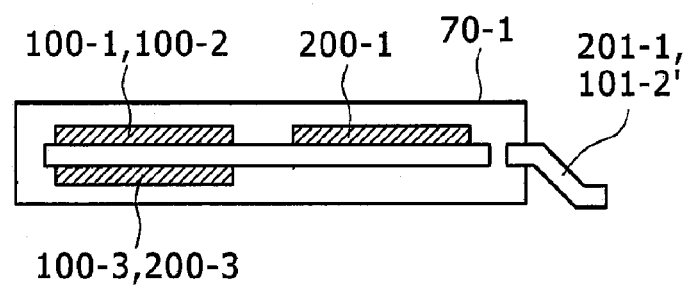
FIG. 39 is a cross sectional view showing another example configuration of a redundantly configurable physical quantity conversion sensor of the ninth embodiment of the present invention.

FIG. 38 is a block diagram showing the another example configuration of the redundantly configurable physical quantity conversion sensor of the ninth embodiment of the present invention. FIG. 39 is a cross sectional view showing the another example configuration of the redundantly configurable physical quantity conversion sensor of the ninth embodiment of the present invention. In the drawings, the identical reference numerals in FIGS. 1, 7, and 17 refer to the identical portions.

In the present example configuration, the interface section 200-3 and the sensor element 100-3 are mounted in a single chip, and the sensor element 100-3 is mounted in the same package as the sensor elements 100-1 and 100-2. In this case, the configuration may be formed in the manner that a space for mounting of the single chip inclusive of the interface section 200-3 and the sensor element 100-3 and a wire-bonding space for extending the signal lines inclusive of the interface section 200-3 and the sensor element 100-3 are preliminarily provided on the lead frame 71-1. Then, the single chip inclusive of the interface section 200-3 and the sensor element 100-3 are mounted only when the redundancy of the conversion processing section is necessary. In this case, in the event the redundancy is not necessary, cost increases can be restrained, thereby making it possible to provide sensors at costs corresponding to required reliability.

(Motor Control Systems in Respective Embodiments)

Next, example configurations of motor control systems using the physical quantity conversion sensors of the respective embodiments of the present invention will be described herebelow with reference to FIGS. 40 to 50.

First, a first example configuration of a motor control system using the physical quantity conversion sensor of the respective embodiment of the present invention will be described herebelow with reference to FIG. 40.

Figure 40:
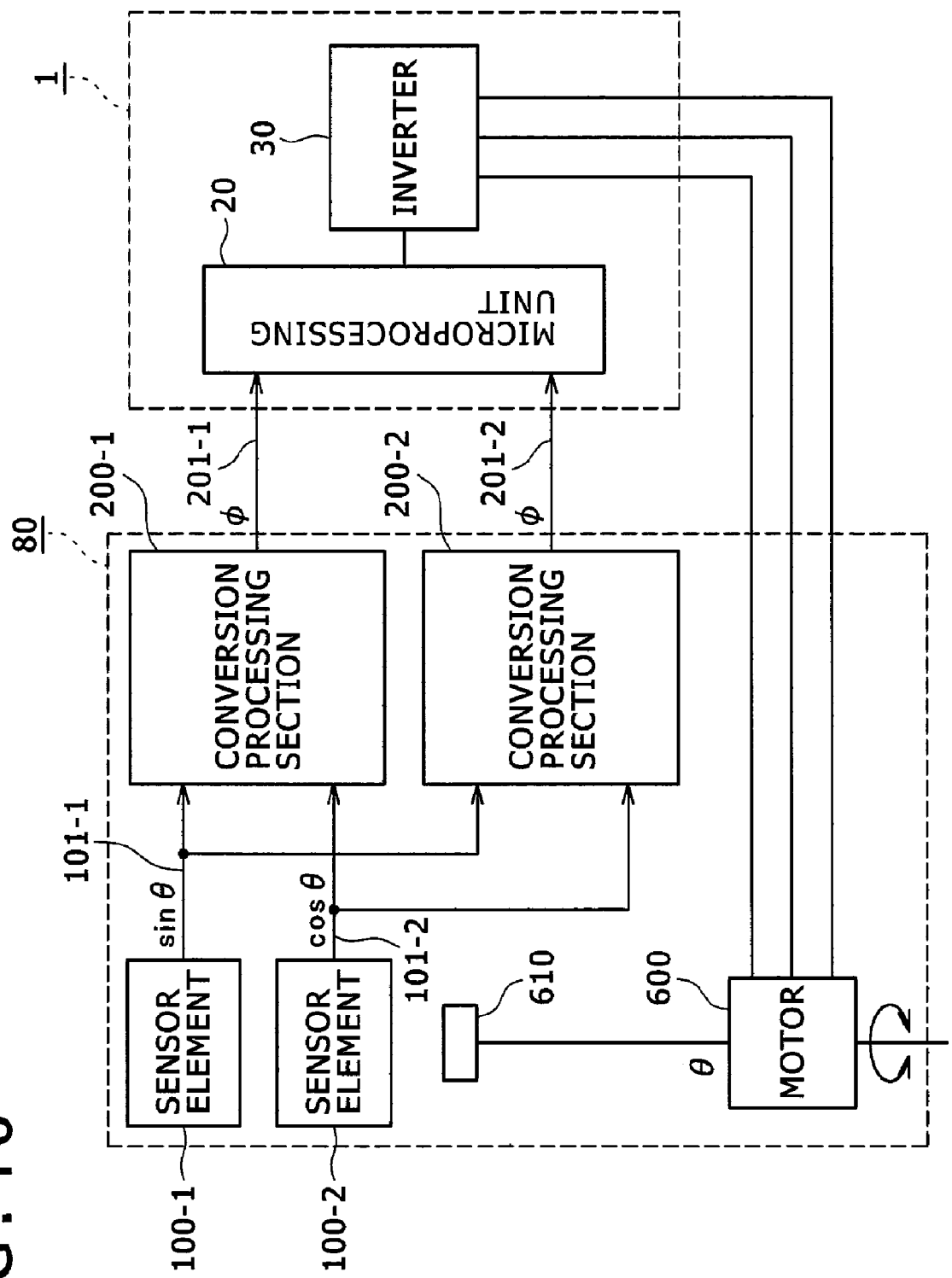
FIG. 40 is a block diagram showing a motor control system using the physical quantity conversion sensor of the respective embodiment the present invention.

FIG. 40 is a block diagram showing the example configuration of the motor control system using the physical quantity conversion sensor of the respective embodiment of the present invention. In the drawing, the identical reference numerals as those in FIGS. 1, 7, and 17 refer to the identical portions.

The motor control system includes a motor section 80 and a motor controller 1. A rotor magnet 610 of the motor section 80 is attached to a rotation shaft of a motor 600. The sensor elements 100-1 and 100-2 are arranged in the extension direction of the rotation shaft of the motor 600 and in the vicinity of the rotor magnet 610.

The rotor magnet 610 supplies the respective sensor elements 100-1 and 100-2 with magnetic flux lines corresponding to the rotation angle θ of the rotation shaft of the motor 600. Corresponding to the rotation angle θ of the motor 600, the sensor elements 100-1 and 100-2, respectively, output the signal 101-1 proportional to the sine ("sin") of the rotation angle θ and the signal 101-2 proportional to the cosign ("cos").

The signal 101-1, which is proportional to the sine ("sin") from the sensor element 100-1, and the signal 101-2, which is proportional to the cosign ("cos") from the sensor element 100-2, are input into the respective conversion processing sections 200-1 and 200-2, and are converted thereby into estimated values (201-1 and φ201-2 of the rotation angle θ.

The estimated values φ201-1 and φ201-2 are input into a microprocessing unit 20 of the motor controller 1. The microprocessing unit 20 performs comparison-checking of the input estimated values φ201-1 and φ201-2 of the rotation angle θ, thereby to determine whether the estimated values φ201-1 and φ201-2 are normal. Further, in the event that the estimated values φ201-1 and φ201-2 are normal, the microprocessing unit 20 outputs a command that is implemented to generate an appropriate three-phase AC current to an inverter 30 in accordance with the estimated values φ201-1 and φ201-2. The inverter 30 outputs the three-phase AC current in accordance with the command supplied from the microprocessing unit 20, thereby to drive the motor 600.

In many cases, control to be performed in the microprocessing unit 20 is vector control. As such, in many cases, the command supplied from the microprocessing unit 20 to generate the three-phase AC current microprocessing unit 20 is a PWM (pulse width modulation) wave indicative of the respective phase.

In the event that, as a result of the comparison-checking of the input estimated values φ201-1 and φ201-2 in the microprocessing unit 20, a significant difference therebetween has been detected, any one of the estimated values φ201-1 and φ201-2 is determined to be abnormal. In this event, the microprocessing unit 20 causes outputting to the inverter 30 to stop, thereby to cause driving of the motor 600 to stop.

In regard to the implementation (or mounting) method, the method of the type shown in FIGS. 7 to 11 for the sensor elements 100-1 and 100-2 and the conversion processing sections 200-1 and 200-2 is well suitable for the system configuration of the present example. Similarly, the embodiment examples such as shown in FIGS. 21 and 22 and FIG. 23 can also be suitably applied. That is, in the embodiment example shown in FIGS. 21 and 22, the negative value of the estimated value φ is output from the conversion processing section 200-2; and in the embodiment example shown in FIG. 23, φ'π/2−θ is output from the conversion processing section 200-2.

Next, a second example configuration of a motor control system using the physical quantity conversion sensor of the respective embodiment of the present invention will be described herebelow with reference to FIG. 41.

Figure 41:
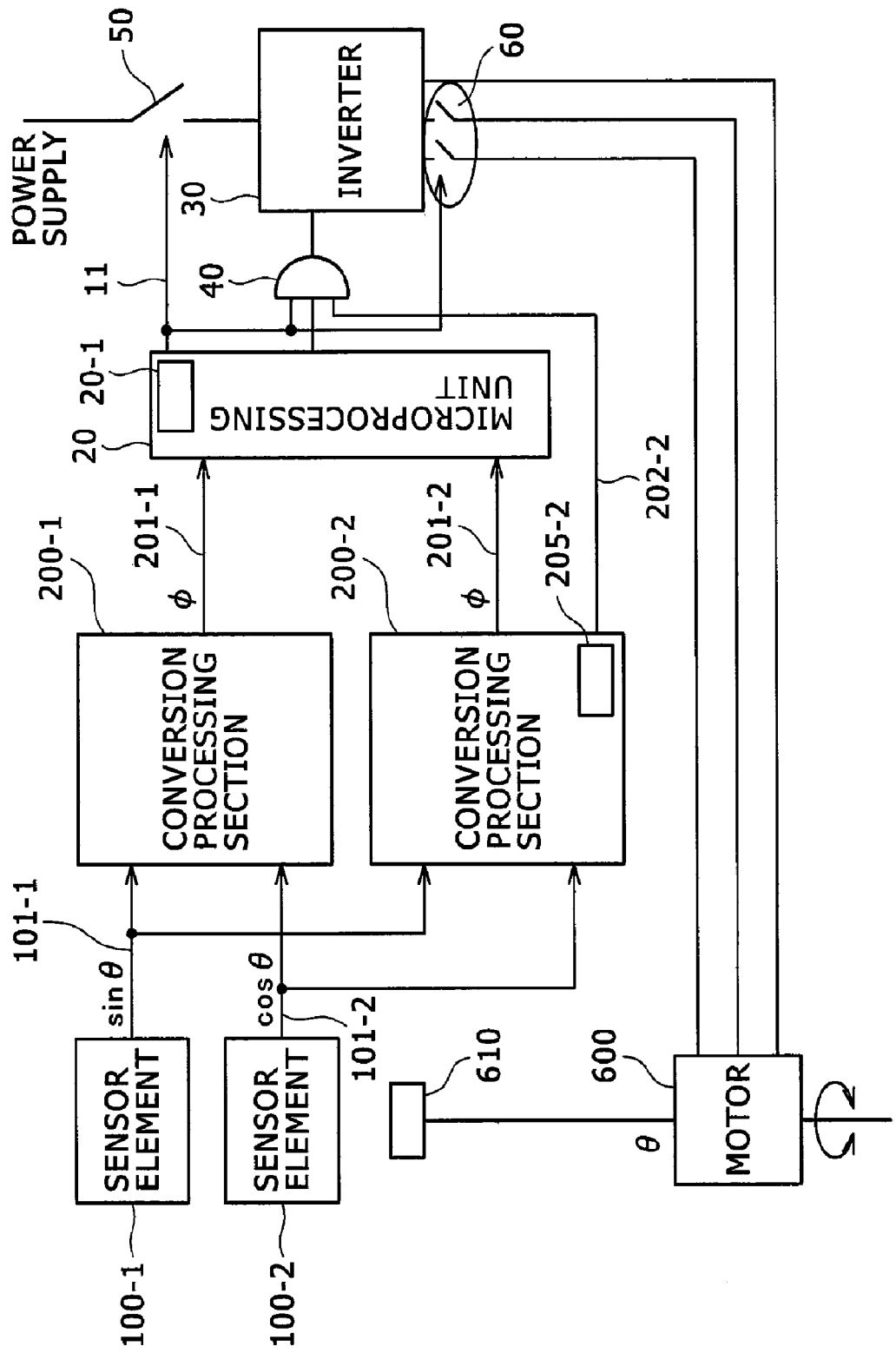
FIG. 41 is a block diagram showing a motor control system using the physical quantity conversion sensor of the respective embodiment the present invention.

FIG. 41 is a block diagram showing the example configuration of the motor control system using the physical quantity conversion sensor of the respective embodiment of the present invention. In the drawing, the identical reference numerals as those in FIGS. 1, 7, 17, and 40 refer to the identical portions.

In the present example, as shown in FIG. 25, the conversion processing section 200-2 includes the diagnostic function section 205-2 internally provided. In addition, the microprocessing unit 20 includes a diagnostic function section 20-1.

A command signal supplied from the microprocessing unit 20 to the inverter 30 is input into an AND gate 40 together with the diagnosis result signal 202-2 from the diagnostic function section 205-2 provided inside of the conversion processing section 200-2 and an abnormal detection signal 11 from the diagnostic function section 20-1 of the microprocessing unit 20. Then, only in the event of an H level indicative that all are normal, the inverter 30 drives the motor 600.

Further, in the event that an abnormal value has been detected, a power source relay 50 and a motor driving relay 60 are controlled in accordance with the abnormal detection signal 11 from the diagnostic function section 20-1 of the microprocessing unit 20, thereby to cause driving of the motor 600 to stop.

In this case, although not shown in the drawing, the power source relay 50 and the motor driving relay 60 may be controlled in accordance with the diagnosis result signal 202-2 that is output from the diagnostic function section 205-2. Still alternatively, the power source relay 50 and the motor driving relay 60 may be controlled in accordance with the result of AND-ing (AND-logic integration) of the abnormal detection signal 11 from the microprocessing unit 20 and the diagnosis result signal 202-2 from the diagnostic function section 205-2.

Next, a third example configuration of a motor control system using the physical quantity conversion sensor of the respective embodiment of the present invention will be described herebelow with reference to FIG. 42.

Figure 42:
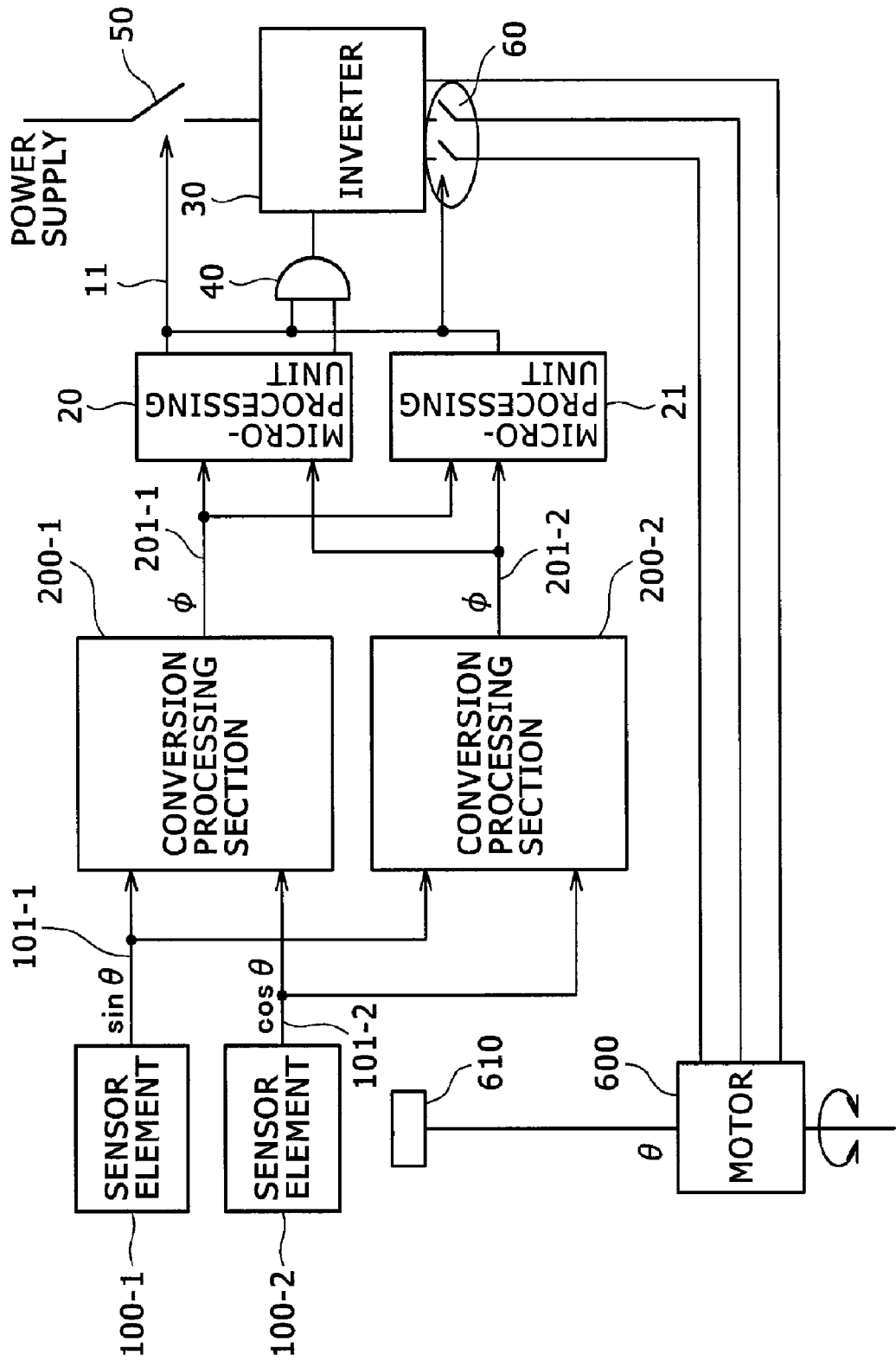
FIG. 42 is a block diagram showing a motor control system using the physical quantity conversion sensor of the respective embodiment the present invention.

FIG. 42 is a block diagram showing the example configuration of the motor control system using the physical quantity conversion sensor of the respective embodiment of the present invention. In the drawing, the identical reference numerals as those in FIGS. 1, 7, 17, 40, and 41 refer to the identical portions.

In the present example, the configuration includes a microprocessing unit 21 in addition to the microprocessing unit 20. The microprocessing unit 21 also performs comparison-checking of the input estimated values φ201-1 and φ201-2 of the rotation angle θ, thereby to determine whether the estimated values φ201-1 and φ201-2 are normal. As a result, in the event that an abnormal value has been detected, the microprocessing unit 21 outputs the abnormal detection signal 11.

Next, example configurations of motor sections used in the motor control systems of the respective embodiments of the present invention will be described below with reference to FIGS. 43 and 44.

First, a first example configuration of the motor section of the respective embodiment of the present invention will be described herebelow with reference to FIG. 43.

Figure 43:
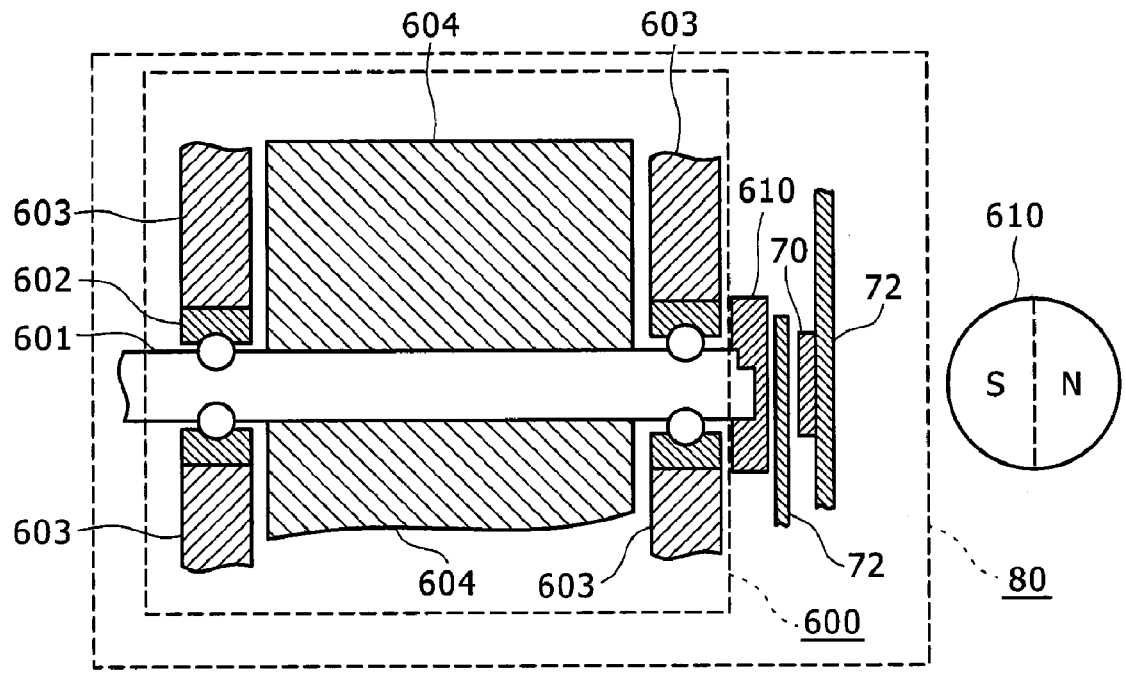
FIG. 43 is a cross sectional view showing a first example configuration of a motor section used in the motor control system of the respective embodiment of the present invention.

FIG. 43 is a cross sectional view showing the first example configuration of the motor section used in the motor control system of the respective embodiment of the present invention. In the drawing, the identical reference numerals to those in FIG. 40 refer to the identical portions.

The motor 600 of the motor section 80 includes a housing 603 and a rotor 604. A stator is not shown in the drawing.

A rotation shaft 601 to which the rotor 604 is attached is attached to the housing 603 of the motor to be rotatable through a bearing 602. The rotor magnet 610 is attached to one end of the rotor 604. In the present example configuration, the rotor magnet 610 is a two-pole type having N and S poles.

A package 70 of a rotation angle sensor, which is a physical quantity conversion sensor, is provided in the extension direction of the rotation shaft 604 of the rotor magnet 610. The package 70 is mounted onto a circuit board 72. A seal 72 is provided between the rotor magnet 610 and the package 70. The provision of the seal 72 prevents that foreign matters, such as dust and oil mist, adhere or deposit onto electronic components including the package 70 mounted on the circuit board 72 to the extent of causing deterioration and/or operation failure.

Next, a second example configuration of the motor section of the respective embodiment of the present invention will be described herebelow with reference to FIG. 44.

Figure 44:
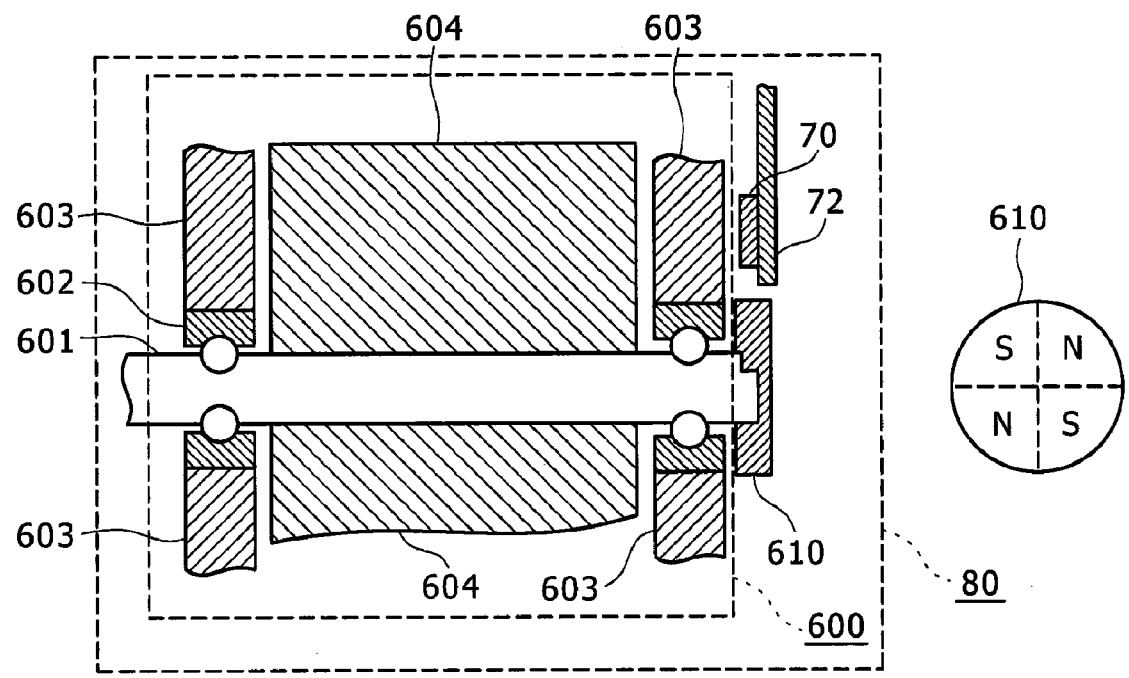
FIG. 44 is a cross sectional view showing the first example configuration of the motor section used in the motor control system of the respective embodiment of the present invention.

FIG. 44 is a cross sectional view showing the first example configuration of the motor section used in the motor control system of the respective embodiment of the present invention. In the drawing, the identical reference numerals to those in FIG. 43 refer to the identical portions.

In the present example configuration, the rotor magnet 610 is of a four-pole type having two N poles and two S poles. In the case of the four-pole type, compared with the two-pole type, the frequency of the signal proportional to the sine ("sin") or cosign ("cos") is twice (cycle is half) the signal in the case of the two-pole type.

Next, a fourth example configuration of a motor control system using the physical quantity conversion sensor of the respective embodiment of the present invention will be described herebelow with reference to FIG. 45.

Figure 45:
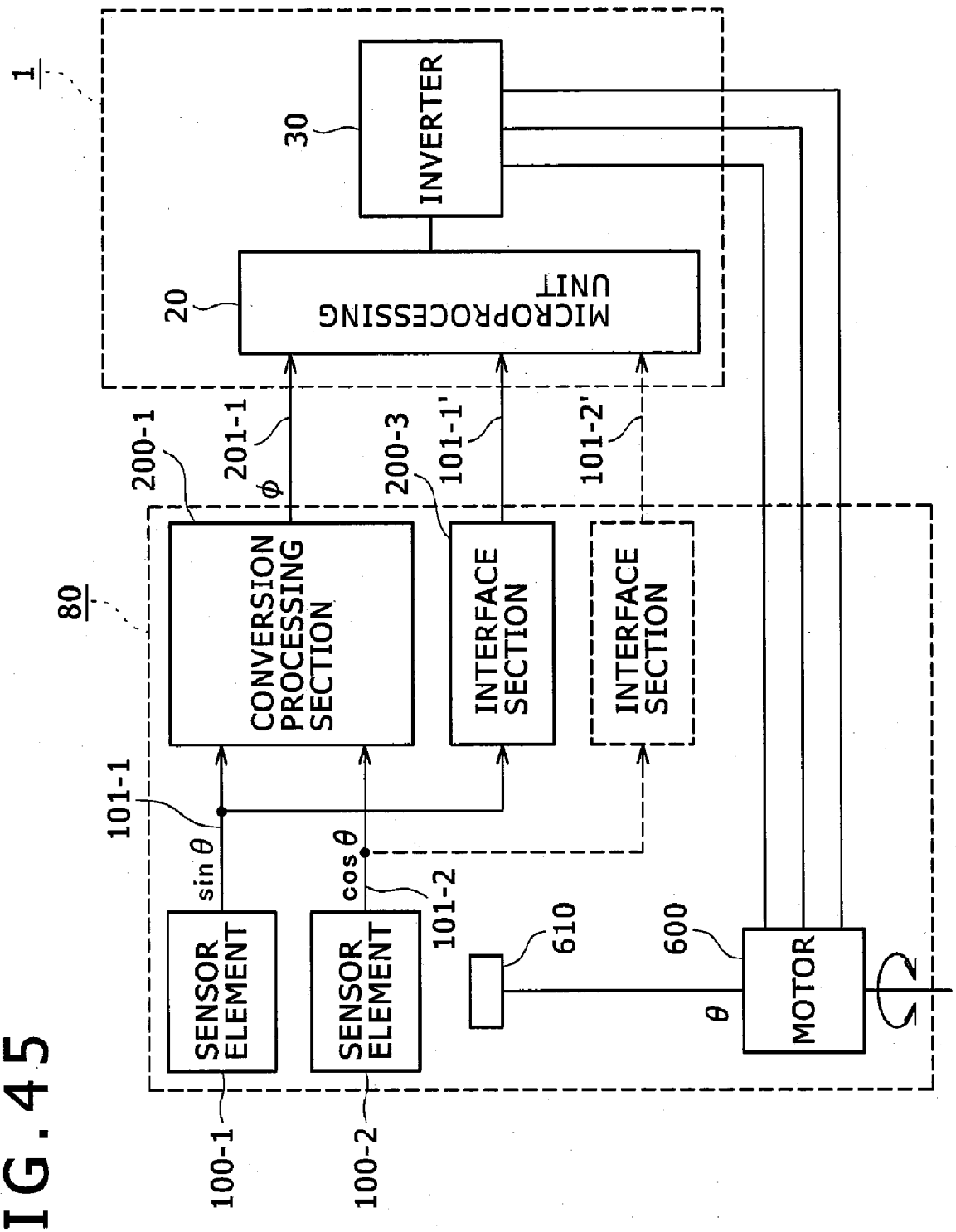
FIG. 45 is a block diagram showing a motor control system using the physical quantity conversion sensor of the respective embodiment the present invention.

FIG. 45 is a block diagram showing the example configuration of the motor control system using the physical quantity conversion sensor of the respective embodiment of the present invention. In the drawing, the identical reference numerals as those in FIGS. 1, 7, 17, 38, and 40 refer to the identical portions.

A motor section 80 includes the interface section 200-3 in addition to the conversion processing section 200-1. In addition to the estimated value φ201-1 of the rotation angle θ from the conversion processing section 200-1, the signal 101-1 proportional to the sine ("sin") from the sensor element 100-1 is input as an interface-section output 101-1' (of the interface section 200-3) into the microprocessing unit 20.

The microprocessing unit 20 estimates a value of the interface-section output 101-1' from the input estimated value φ201-1 of the rotation angle θ. Then, the microprocessing unit 20 performs comparison-checking of the estimated value with the actually input interface-section output 101-1', thereby to determine whether the estimated values φ201-1 of the rotation angle θ is normal.

As a result, in the event the estimated value φ201-1 is normal, the microprocessing unit 20 controls the inverter 30 to operate in accordance with the estimated value φ201-1, thereby to drive the motor 600. In the event the estimated value φ201-1 is abnormal, the microprocessing unit 20 causes outputting to the inverter 30 to stop, thereby to stop driving of the motor 600. The implementation (or mounting) methods shown in FIGS. 28 to 31, 37, and 38 are well suitable for the present example configuration.

Further, as shown by the broken line in the drawing, the configuration can include an interface section 200-3'. In this case, in addition to the estimated value of the rotation angle θ from the conversion processing section 200-1, the signal 101-1 proportional to the sine ("sin") from the sensor element 100-1 and the signal 101-2 proportional to the cosign ("cos") from the sensor element 100-2 are both input into the microprocessing unit 20. The respective estimated values φ201-1 and φ201-2 are thus input as interface-section outputs 101-1' and 101-2' through the respective interface sections 200-3 and 200-3'. The microprocessing unit 20 estimates a value of the rotation angle θ from the input interface-section outputs 101-1' and 101-2'. Then, the microprocessing unit 20 performs comparison-checking of the estimated result with the input estimated value $\phi$201-1, thereby to determine whether the estimated values $\phi$201-1 of the rotation angle θ is normal. The estimation of the rotation angle θ in the microprocessing unit 20 can be implemented by performing a process similar in contents to the conversion processing in the conversion processing section 200-1.

Next, a fifth example configuration of a motor control system using the physical quantity conversion sensor of the respective embodiment of the present invention will be described herebelow with reference to FIG. 46.

Figure 46:
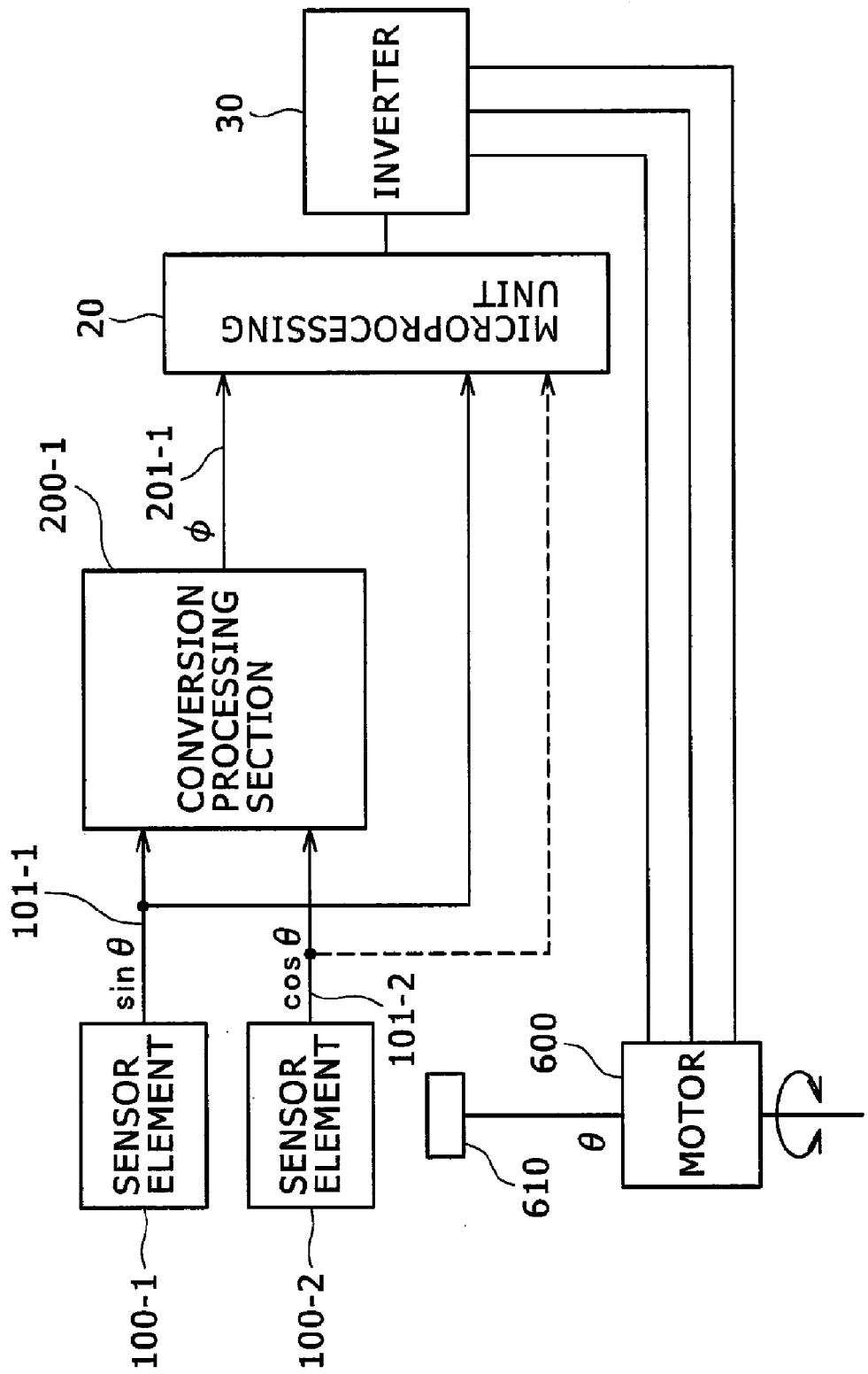
FIG. 46 is a block diagram showing a motor control system using the physical quantity conversion sensor of the respective embodiment the present invention.

FIG. 46 is a block diagram showing the example configuration of the motor control system using the physical quantity conversion sensor of the respective embodiment of the present invention. In the drawing, the identical reference numerals as those in FIGS. 1, 7, 17, 38, and 40 refer to the identical portions.

In the present example configuration, in addition to the estimated value $\phi$201-1 of the rotation angle θ from the conversion processing section 200-1, the signal 101-1 proportional to the sine ("sin") from the sensor element 100-1 is input into the microprocessing unit 20. The microprocessing unit 20 estimates a value of the signal 101-1 proportional to the sine ("sin") from the input estimated value $\phi$201-1 of the rotation angle θ. Then, the microprocessing unit 20 performs comparison-checking of the estimated value with the actually input signal 101-1 proportional to the sine ("sin"), thereby to determine whether the estimated values $\phi$201-1 of the rotation angle θ is normal.

As a result, in the event the estimated value $\phi$201-1 is normal, the microprocessing unit 20 controls the inverter 30 to operate in accordance with the estimated value $\phi$201-1, thereby to drive the motor 600. In the event that the estimated value $\phi$201-1 has been determined to be abnormal, the microprocessing unit 20 causes outputting to the inverter 30 to stop, thereby to causing driving of the motor 600 to stop. The implementation (or mounting) methods shown in FIGS. 1 to 6B are well suitable for the present example configuration.

Further, as shown by the broken line, in addition to the estimated value $\phi$201-1 of the rotation angle θ from the signal 101-1 proportional to the sine ("sin") from the sensor element 100-1 conversion processing section 200-1, the signal 101-1 proportional to the sine ("sin") from the sensor element 100-1 and the signal 101-2 proportional to the cosign ("cos") from the sensor element 100-2 may be input into the microprocessing unit 20. In this case, the microprocessing unit 20 estimates the rotation angle θ from the signal 101-1 proportional to the sine ("sin") and signal 101-2 proportional to the cosign ("cos"). Then, the microprocessing unit 20 performs comparison-checking of the estimated result with the input estimated value $\phi$201-1 of the rotation angle θ, thereby to determine whether the estimated values $\phi$201-1 of the rotation angle θ is normal.

Also in each of the embodiment examples shown in FIGS. 45 and 46, the configuration can be arranged to operate as shown in FIG. 41. That is, the command signal supplied from the microprocessing unit 20 to the inverter 30 is input into an AND gate 40 together with, for example, the diagnosis result signal 202-2 from the diagnostic function section 205-2 provided inside of the conversion processing section 200-2 and the abnormal detection signal 11 from the microprocessing unit 20. Then, only in the event of an H level indicative that all are normal, the inverter 30 drives the motor 600. Further, the configuration can be arranged to operate such that, in the event that an abnormal value has been detected, the power source relay 50 and the motor driving relay 60 are controlled in accordance with, for example, the abnormal detection signal 11 from the microprocessing unit 20, thereby to cause driving of the motor 600 to stop. Further, the configuration can be arranged to operate such that, as shown in FIG. 44, independently of the microprocessing unit 20, the microprocessing unit 21 determines whether the estimated value $\phi$201-1 is normal.

Next, an electric power steering system, which is a first practical example of the motor control system of the respective embodiment of the present invention, will be described herebelow with reference to FIG. 47.

Figure 47:
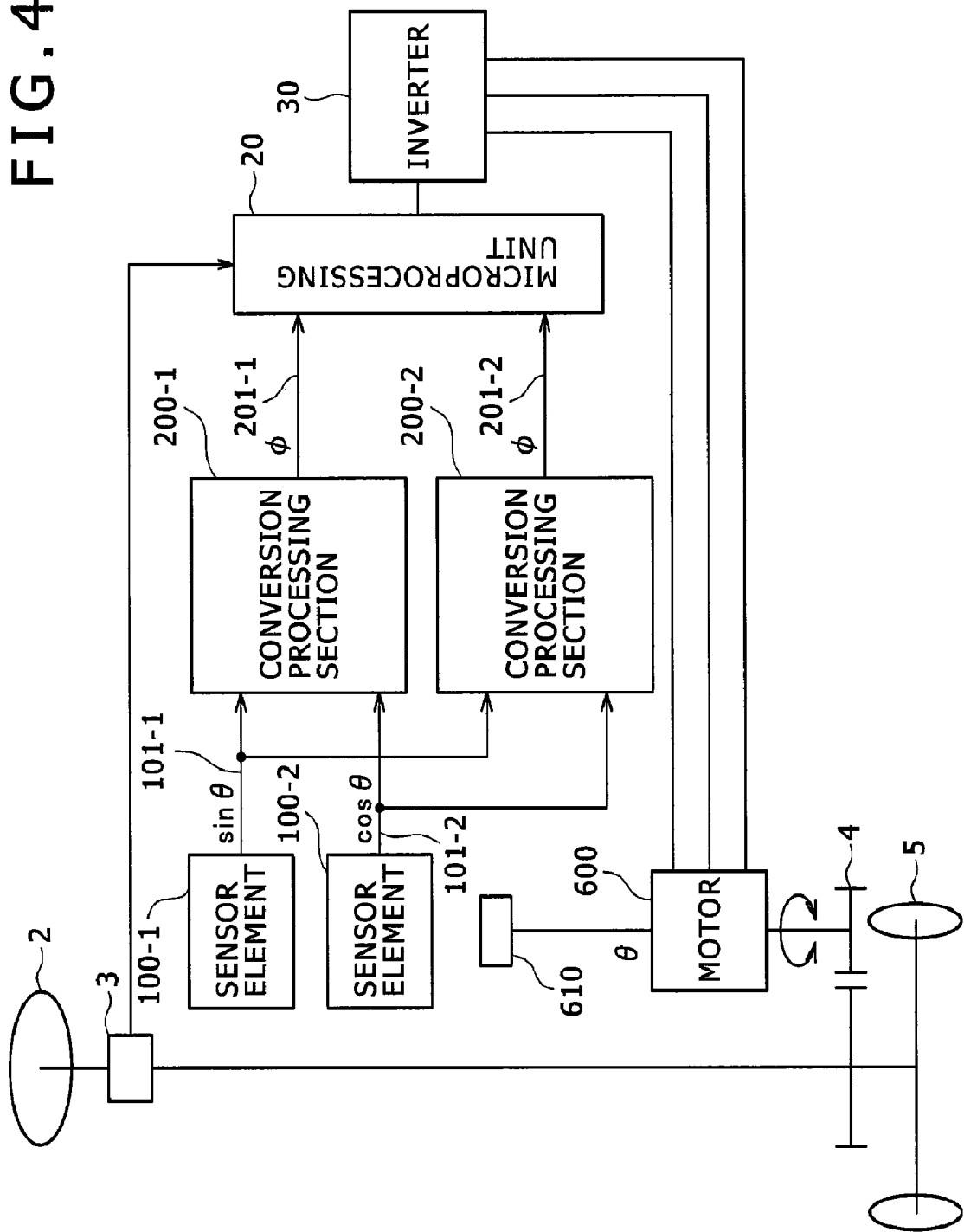
FIG. 47 is a block diagram showing an example configuration of the electric power steering system, which is a first practical example of the motor control system of the respective embodiment of the present invention.

FIG. 47 is a block diagram showing an example configuration of the electric power steering system, which is the first practical example of the motor control system of the respective embodiment of the present invention. In the drawing, the identical reference numerals as those in FIG. 40 refer to the identical portions.

In the present practical example, in addition to the motor controller 1 and the motor section 80, which are provided in the example configuration of the motor control system shown in FIG. 40, a steering wheel 2, a torque sensor 3, and a steering mechanism 5 are mechanically integrated with an output shaft of the motor 600.

The microprocessing unit 20 of the motor controller 1 controls the motor 600 so that the motor 600 outputs an assist torque corresponding to an operation force of a driver or vehicle operator detected by a torque sensor 3.

In the electric power steering system shown in FIG. 47, in place of the steering mechanism 5, should a mechanism of operating a braking function through a deceleration mechanism 4 be coupled to the output shaft of the motor 600, an electric braking system can be configured.

Next, an electronically-controlled throttle system, a second practical example of the motor control system of the respective embodiment of the present invention, will be described herebelow with reference to FIGS. 48 and 49.

Figure 48:
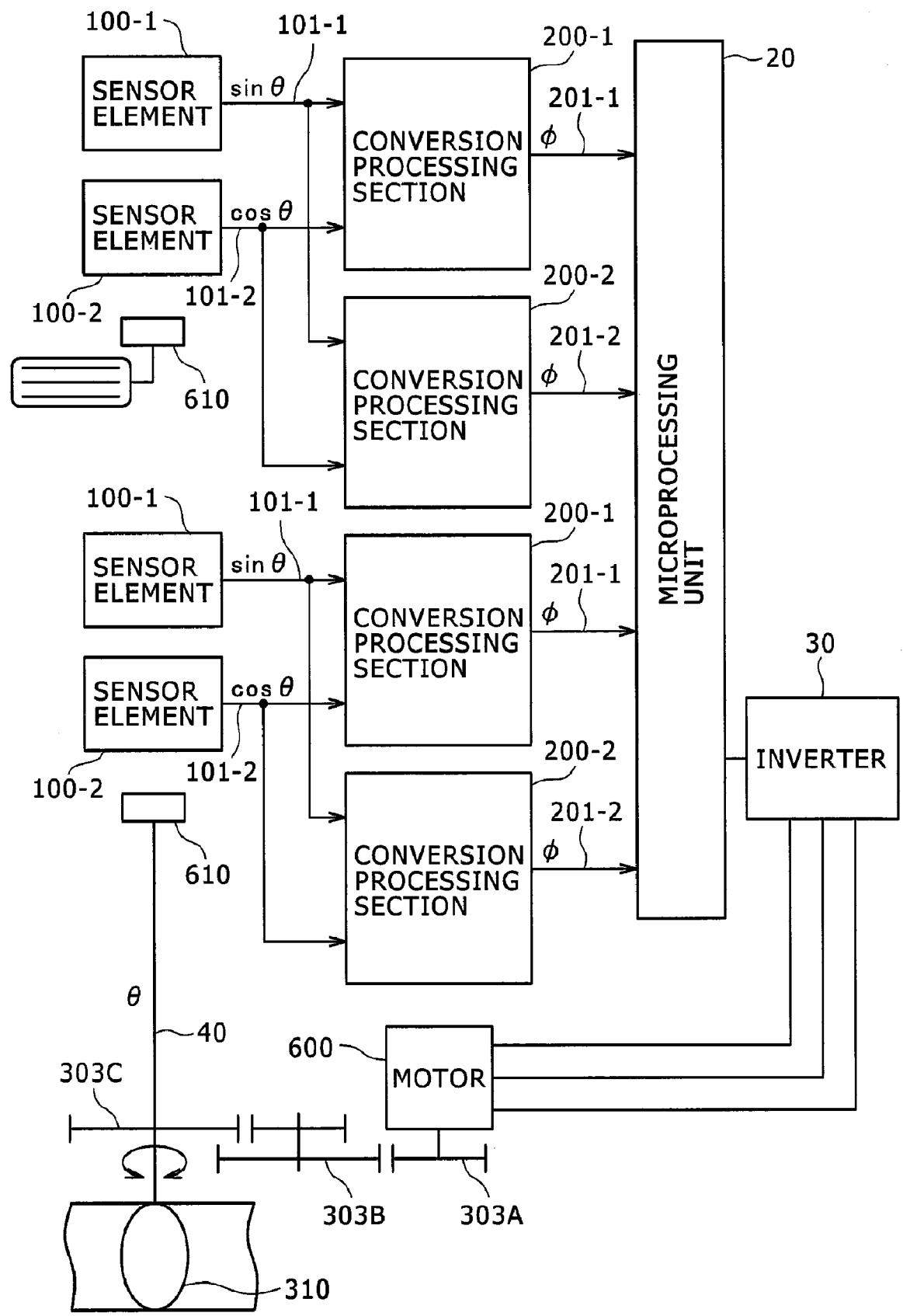
FIG. 48 is a block diagram showing an example configuration of the electric power steering system, which is a second practical example of the motor control system of the respective embodiment of the present invention.
Figure 49:
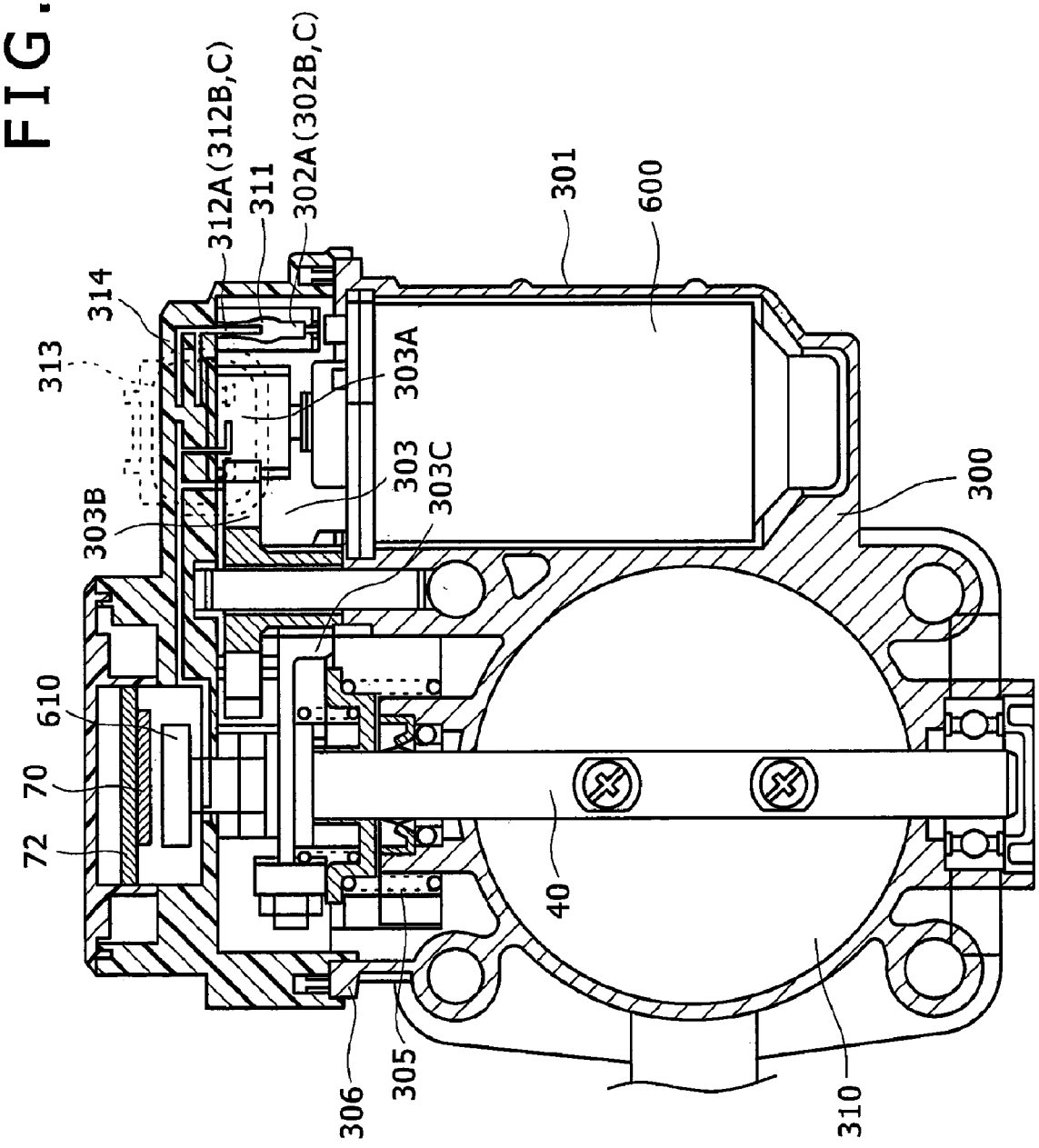
FIG. 49 is a cross sectional view showing the example configuration of the electric power steering system, which is the second practical example of the motor control system of the respective embodiment of the present invention.

FIG. 48 is a block diagram showing an example configuration of the electric power steering system, which is the second practical example of the motor control system of the respective embodiment of the present invention. In the drawing, the identical reference numerals as those in FIG. 40 refer to the identical portions. FIG. 49 is a cross sectional view showing the example configuration of the electric power steering system, which is the second practical example of the motor control system of the respective embodiment of the present invention.

In the present practical example, as shown in FIG. 48, in the motor controller 1 and the motor section 80, which are provided in the example configuration of the motor control system shown in FIG. 40, a throttle position sensor is provided. The throttle position sensor is configured from the rotor magnet 610 coupled to a throttle valve 310 via the rotation shaft of the motor 600, the sensor elements 100-1 and 100-2, and the conversion processing sections 200-1 and 200-2. Further, the configuration includes an accelerator position sensor configured from a rotor magnet 610' coupled to an accelerator pedal 5, the sensor elements 100-1' and 100-2', and the conversion processing sections 200-1' and 200-2'.

The amount of operation of the accelerator pedal 5 by the driver is input as redundant outputs $\phi$201-1' and $\phi$201-2 into the microprocessing unit 20. Similarly, the travel or opening (position) of the throttle valve 310 is input as redundant outputs $\phi$201-1 and 201-2 into the microprocessing unit 20.

The microprocessing unit 20 controls the opening of the throttle valve 310 in accordance with the redundant outputs $\phi$201-1' and $\phi$201-2'. The opening of the throttle valve 310 is input as redundant outputs $\phi$201-1 and $\phi$201-2 into the microprocessing unit 20. The microprocessing unit 20 performs control so that the difference from the redundant outputs φ201-1' and φ201-2', which are each a target value becomes zero.

The power of the motor 600 is transmitted to a throttle valve shaft 40 via a gear mechanism 303 (including a pinion 303A, intermediate gear 303B, and final gear 303C) thereby to drive the throttle valve 310.

Further, in the event that a mismatching or contradictory relationship occurs between the redundant outputs φ201-1 and φ201-2' of the accelerator position sensor and the redundant outputs φ201-1 and φ201-2 of the throttle position sensor, the accelerator position sensor and/or the throttle position sensor is abnormal. Hence, devices (means) shown in, for example, FIGS. 41 and 42 stops the operation of the motor 600, a default mechanism forcibly returns the throttle opening to a predetermined throttle opening.

Next, an example configuration of an electronically-controlled throttle device will be described herebelow with reference to FIG. 49.

A gear cover 314 of the gear mechanism 303 for motor power transmission is attached to a throttle body 300 that includes the throttle valve 310. A throttle position sensor (throttle valve rotation angle detection device) is attached to the gear cover 314. The gear cover 314 is made of a synthetic resin, and is integrally formed with a connector 313 that includes an external connection terminal that is used for electrical connection between an external device and a power supply. In the throttle body 300, a motor housing 301 for housing the motor 600 that drives the throttle valve shaft 40, and a gear housing 306 in which the gear mechanism 303 and the default mechanism are arranged, are integrally formed. The gear cover 314 covers the gear housing 306. A sensor housing is formed in the gear cover 314.

Power supply terminals of motor 600 (302A and 302B in a brushed motor/302A, 302B, and 302C in a brushless motor) are connected to intermediate terminals 312A and 312B provided to the gear cover 314 via a connection metal furniture 311. The power of the motor 600 is transmitted to the throttle valve shaft 40 via the gear mechanism 303 (pinion 303A, intermediate gear 303B, and final gear 303C) thereby to drive the throttle valve 310. The rotor magnet 610 is attached to one end 41 of the throttle valve shaft 40. A return force is exerted by a return spring 305 on the throttle valve shaft 40.

Next, another example configuration of an electronically-controlled throttle system, which is a second practical example of the motor control system of the respective embodiment of the present invention, will be described herebelow with reference to FIG. 50.

Figure 50:
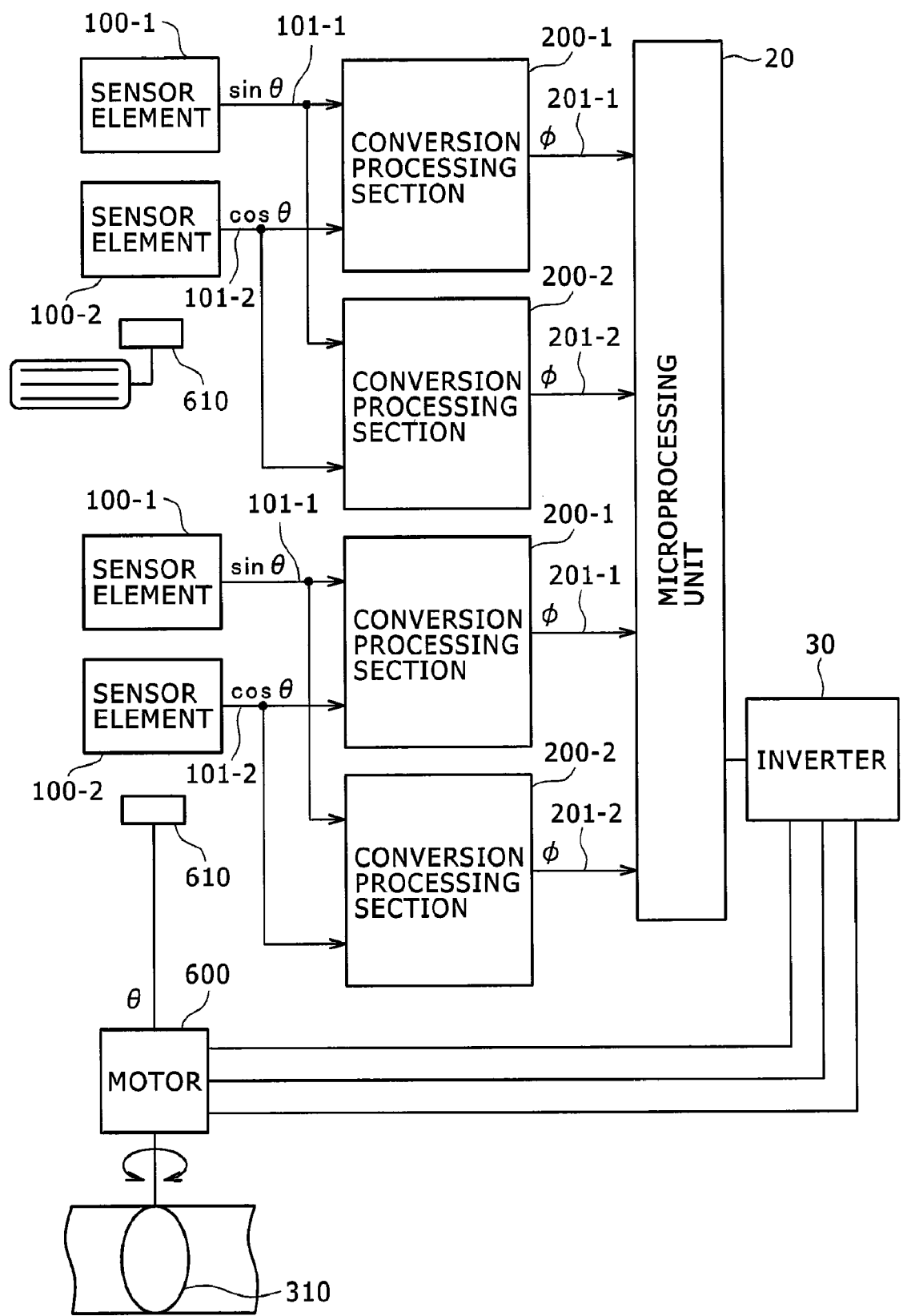
FIG. 50 is a block diagram showing another example configuration of the electric power steering system, which is the second practical example of the motor control system of the respective embodiment of the present invention.

FIG. 50 is a block diagram showing the another example configuration of the electric power steering system, which is the second practical example of the motor control system of the respective embodiment of the present invention. In the drawing, the identical reference numerals as those in FIG. 48 refer to the identical portions.

In the present configuration example, the power of the motor 600 is transmitted to the throttle valve shaft 40 without being passed through the gear mechanism, thereby to drive the throttle valve 310.

As described above, according to the respective embodiment of the present invention, the output terminals for outputting the signals proportional to the sine ("sin") and cosign ("cos") from the sensor elements to the outside of the package. Thereby, the conversion processing sections can be redundantly provided on the outside of the package by necessity, and hence the fault detection for the conversion processing sections can be implemented, and costs can be optimized.

Further, in the case where the conversion processing sections redundantly provided on the outside of the package are implemented with software to be operable in a microcomputer, a necessary minimum redundant configuration can be realized without additional hardware being required. This leads to cost reduction.

What is claimed is:

1. A physical quantity conversion sensor comprising:
    a first sensor element that outputs a first output signal in correspondence to a first physical quantity acting from the outside;
    a second sensor element that outputs a second output signal associated with the first output signal in correspondence to the first physical quantity acting from the outside;
    a first conversion processing section that converts the first output signal output from the first sensor element and the second output signal output from the second sensor element into the second physical quantity;
    a second conversion processing section that converts the first output signal output from the first sensor element and the second output signal output from the second sensor element into the second physical quantity; and
    wherein the first and second sensor elements are a plurality of giant magnetic resistance elements (GMR elements) having a multilayer structure including a fixed magnetic layer having a fixed magnetization direction, a nonmagnetic conductive layer, and a free magnetic layer.

2. A physical quantity conversion sensor according to claim 1, wherein
    the first physical quantity is a direction of magnetic flux lines; and
    the second physical quantity is an angle.

3. A physical quantity conversion sensor according to claim 2, wherein the second physical quantity is a rotation angle of a permanent magnet attached to a rotation shaft.

4. A physical quantity conversion sensor according to claim 3, wherein
    the first sensor element outputs a signal proportional to the sine of an angle of the direction of the magnetic flux lines with respect to a reference direction; and
    the second sensor element outputs a signal proportional to the cosine of the angle of the direction of the magnetic flux lines with respect to the reference direction.

5. A physical quantity conversion sensor according to claim 1, wherein the first and second sensor elements and the first and second conversion processing sections are arranged in a common package.

6. A physical quantity conversion sensor according to claim 1, wherein the first and second conversion processing sections each include a diagnostic function section that performs diagnosis of a result of conversion of the second output signal into the second physical quantity.

7. The physical quantity conversion sensor according to claim 1, further comprising:
    an output terminal that outputs an output of each of the first and second sensor elements to the outside of a first package;
    wherein the first and second sensor elements and the first conversion processing section are arranged in the first package.

8. A physical quantity conversion sensor according to claim 7, wherein the second conversion processing section is connected to the output terminal.

9. A physical quantity conversion sensor according to claim 7, further comprising an area where a third sensor element is mounted.

10. A physical quantity conversion sensor comprising:
a first sensor element that outputs a first output signal in correspondence to a first physical quantity acting from the outside;
a second sensor element that outputs a second output signal associated with the first output signal in correspondence to the first physical quantity acting from the outside;
a first conversion processing section that converts the first output signal output from the first sensor element and the second output signal output from the second sensor element into the second physical quantity;
a second conversion processing section that converts the first output signal output from the first sensor element and the second output signal output from the second sensor element into the second physical quantity; wherein,
the first and second sensor elements and the first conversion processing section are arranged in a first package; and
the second conversion processing section is arranged in a second package.

11. The physical quantity conversion sensor according to claim 10, wherein:
the first and second conversion processing sections each include a diagnostic function section that performs diagnosis of a result of conversion of the second output signal into the second physical quantity.

12. The physical quantity conversion sensor according to claim 11, wherein
the second conversion processing section that is connected to the output terminal.

13. The physical quantity conversion sensor according to claim 11, further comprising an area where a third sensor element is mounted.

14. The physical quantity conversion sensor according to claim 10, further comprising an output terminal outputs that an output of each of the first and second sensor elements to the outside of a first package.

15. A physical quantity conversion sensor comprising:
a first sensor element that outputs a first output signal in correspondence to a first physical quantity acting from the outside;
a second sensor element that outputs a second output signal associated with the first output signal in correspondence to the first physical quantity acting from the outside; and
a first conversion processing section that converts the first output signal output from the first sensor element and the second output signal output from the second sensor element into the second physical quantity; and
a second conversion processing section that converts the first output signal output from the first sensor element and the second output signal output from the second sensor element into a third physical quantity associated with the second physical quantity; wherein,
the first and second sensor elements and the first conversion processing sections are arranged in a first package; and
the second conversion processing section is arranged in a second package.

16. A physical quantity conversion sensor comprising:
a first sensor element that outputs a first output signal in correspondence to a first physical quantity acting from the outside;
a second sensor element that outputs a second output signal associated with the first output signal in correspondence to the first physical quantity acting from the outside;
a third sensor element that outputs the second output signal associated with the first output signal in correspondence to the first physical quantity acting from the outside;
a first conversion processing section that converts the first output signal output from the first sensor element and the second output signal output from the second sensor element into the second physical quantity; and
a second conversion processing section that converts the first output signal output from the first sensor element and the second output signal output from the third sensor element into a third physical quantity associated with the second physical quantity; wherein,
the first and second sensor elements and the first conversion processing section are arranged in a first package; and
the second conversion processing section is arranged in a second package.

17. A motor control system comprising:
a motor;
motor control means that controls a rotation angle of the motor;
a magnet that rotates with rotation of a rotation shaft of the motor; and
a rotation angle sensor that detects a direction of magnetic flux lines generated by the magnet to thereby detect a rotation angle of the motor,
wherein
the rotation angle of the motor is controlled in accordance with the rotation angle detected by the rotation angle sensor; and
the rotation angle sensor includes
a first sensor element that outputs a first output signal in correspondence to a direction of the magnetic flux lines acting from the outside;
a second sensor element that outputs a second output signal associated with the first output signal in correspondence to a direction of the magnetic flux lines acting from the outside;
a first conversion processing section that converts the first output signal output from the first sensor element and the second output signal output from the second sensor element into a signal representing the rotation angle of the motor; and
a second conversion processing section that converts the first output signal output from the first sensor element and the second output signal output from the second sensor element into the second physical quantity.

18. A motor control system according to claim 17, wherein the motor control means includes a microprocessing unit that, in an instance where an output of the first conversion processing section and an output of the second conversion processing section do not correspond to one another, recognizes the event to be abnormal and causes motor drive outputting to stop.

19. A motor control system according to claim 17, wherein the second conversion processing section is realized by the microprocessing unit.

20. A motor control system according to claim 17, wherein
the motor generates an assist torque corresponding to an operation force of a driver of an automobile; and
the magnet is attached to the rotation shaft of the motor.

21. A motor control system according to claim 17, wherein
the rotation angle sensor includes a first rotation angle sensor attached to a rotation shaft of an accelerator pedal, and a second rotation angle sensor attached to a rotation shaft of a throttle valve; and
the motor causes an opening of the throttle valve to be variable.

* * * * *